(12) United States Patent
Boehm et al.

(10) Patent No.: US 7,513,027 B2
(45) Date of Patent: Apr. 7, 2009

(54) PROCESS AND APPARATUS FOR PRODUCING SERVICE BLADES

(75) Inventors: Hans Volker Boehm, Homburg/Saar (DE); Volker Dietmar Harr, Speyer (DE); Josef Scherer, Frankfurt (DE)

(73) Assignee: ALSTOM Technology Ltd, Baden (CH)

( * ) Notice: Subject to any disclaimer, the term of this patent is extended or adjusted under 35 U.S.C. 154(b) by 136 days.

(21) Appl. No.: 11/192,363

(22) Filed: Jul. 29, 2005

(65) Prior Publication Data
US 2006/0137169 A1 Jun. 29, 2006

Related U.S. Application Data

(63) Continuation of application No. PCT/EP2004/050047, filed on Jan. 28, 2004.

(30) Foreign Application Priority Data
Jan. 31, 2003 (CH) ..................................... 0139/03

(51) Int. Cl.
*B23P 15/02* (2006.01)
*B23C 3/18* (2006.01)
*B23C 1/18* (2006.01)

(52) U.S. Cl. ........................... 29/558; 409/132; 409/96; 409/84; 409/98; 409/104; 409/107; 409/111; 409/120; 29/27 C; 29/889.1; 29/889.7; 700/161; 700/163; 33/551; 33/554; 356/601; 356/607

(58) Field of Classification Search ................. 409/132, 409/131, 84, 93, 94, 95, 96, 98, 99, 104, 409/107, 111, 112, 113, 114, 119, 120; 700/161, 700/163; 29/557–558, 27 C, 27 R, 889.1, 29/889.23, 889.6, 889.7; 33/549, 551, 553, 33/554, 506, 556, 503; 356/601, 607–609
See application file for complete search history.

(56) References Cited

U.S. PATENT DOCUMENTS 5,285,572 A 2/1994 Rathi et al.
(Continued)

FOREIGN PATENT DOCUMENTS
CH 686878 A5 * 7/1996
(Continued)

*Primary Examiner*—Erica E Cadugan
(74) *Attorney, Agent, or Firm*—Steptoe & Johnson LLP

(57) ABSTRACT

A process for machining a blank from all directions with a machine tool, such as a milling machine, involves the machining from all directions being based on a three-dimensional template. In a first step, the three-dimensional form and, if need be, also the surface finish of the three-dimensional template may be automatically measured, and the associated data may be saved. In a second step, a blank may be held by at least one clamping adapter and a first region is brought into its final, ready to use partial form by the machine tool or the milling machine using said data for numerical control. In a third step, the partially machined blank may be held by at least one clamping adapter in the first, finally machined region and the remaining region may be brought into its final, ready to use overall form by the same machine tool or milling machine.

29 Claims, 24 Drawing Sheets

U.S. PATENT DOCUMENTS

| | | | |
|---|---|---|---|
| 5,552,992 A * | 9/1996 | Hunter | 700/118 |
| 6,912,446 B2 * | 6/2005 | Wang et al. | 29/889.1 |
| 7,112,017 B2 * | 9/2006 | Killer et al. | 409/132 |
| 7,261,500 B2 * | 8/2007 | Killer et al. | 409/132 |
| 2005/0191140 A1 * | 9/2005 | Killer et al. | 409/132 |
| 2005/0268461 A1 * | 12/2005 | Ouellette et al. | 29/889.7 |

FOREIGN PATENT DOCUMENTS

| | | |
|---|---|---|
| EP | 0 827 807 A1 | 3/1998 |
| GB | 2 350 809 A | 12/2000 |
| JP | 61-109646 | 10/1984 |
| JP | 63-200937 | 8/1988 |

* cited by examiner

PROCESS AND APPARATUS FOR PRODUCING SERVICE BLADES

CROSS-REFERENCE TO RELATED APPLICATIONS

This application is a continuation of the U.S. National Stage designation of co-pending International Patent Application PCT/EP2004/050047 filed Jan. 28, 2004, which claims priority to Swiss patent application no. 2003 0139/03 filed Jan. 31, 2003, and the entire contents of these applications are expressly incorporated herein by reference thereto.

FIELD OF THE INVENTION

The present invention relates to a process for machining a blank from all directions with a machine tool, such as for example a milling machine, the machining from all directions being based on a three-dimensional template. The present invention also relates to an apparatus for carrying out such a process.

BACKGROUND OF THE INVENTION

In the area of manufacturing turbine blades, usually two-spindle machining is used. This means that a blank is initially subjected to rough pre-machining, subsequently the airfoil region is machined out in detail, then the tip and finally the root are produced. Between these individual machining steps, the workpiece must in each case be rechucked manually or by a robot, because the milling machines are often only capable of carrying out individual machining steps, and in particular because each chucking or mounting of the workpiece only ever allows the machining of a specific region. This type of production is usually referred to as so-called "box production", since usually a machine is respectively responsible for a certain machining step, and because the workpiece can be temporarily stored in a box after each machining step.

One of the problems with such production is the fact that the speed of such a production line is always determined by the speed of the slowest machining step. In addition, the multiplicity of processes for the transfer of workpieces between the individual units, such as milling machines, measuring station, washing stations, etc., requires complicated devices and leads to considerable time losses in the manufacturing process.

The problem is exacerbated if, for example, in the course of service work performed on a gas turbine or steam turbine, the task is to replace moving or stationary blades that were originally produced elsewhere. The production of such individual pieces, or small batches, for which no corresponding drawings or electronic data are available, is extremely complicated and correspondingly cost-intensive. The old concept of manufacturing service blades on old, usually written-off machines in low-wage countries is no longer appropriate for the market, because the reaction time for an offer is too long, the delivery times, for example for the USA, are much too long (currently 14-18 weeks), it is not ensured that the customer will receive an optimum blade (optimized or checked in its efficiency), and the manufacturing costs are too high on account of the old production technology.

SUMMARY OF THE INVENTION

The invention relates to providing a process which allows the disadvantages of the prior art mentioned at the beginning to be overcome. This is quite generally a matter of providing a process for machining a blank from all directions with a machine tool, such as for example a milling machine, the machining from all directions being based on a three-dimensional template.

In a first step, the three-dimensional form and, if need be, also the surface finish of the three-dimensional template is automatically measured, and the associated data are saved. Subsequently, in a second step, a blank, which may be a blank of metal or of a ceramic material, it being possible for the blank to have a rectangular or cylindrical or polyhedral, in particular cuboidal, form and to be a cast or forged blank, is held by at least one gripping adapter and machined by the machine tool or the milling machine using said data for numerical control. In this case, a first region is brought into its final, ready to use partial form. In a subsequent, third step, the partially machined blank is held by at least one clamping adapter in the first, finally machined region and the remaining region is brought into its final, ready to use overall form, in particular preferably by the same machine tool or milling machine, using said data for numerical control.

On the one hand, the invention keeps the measuring of the old component and the actual production of the replacement part as close as possible. On the other hand, the production in only two chucking setups, it being possible for the transfer from one setup to the second setup to take place without manual interventions, has the effect that the degree of automation is increased, and correspondingly production costs are reduced. The usually very high costs associated with such small batches can in this way be kept surprisingly low, and also the production in two chucking setups with the use of the same machine results in increased accuracy of the components and a reduction of the tools or machines that have to be provided. The template is typically a component that is to be replaced, in particular a component to be replaced of a gas turbine or steam turbine, such as for example a moving blade or stationary blade.

A first preferred embodiment of the process according to the invention is characterized in that, after they have been acquired and before they are used for machining the blank from all directions, the data are changed in such a way that the three- dimensional spatial form and, if need be, also the surface finish of the template are either optimized or brought again to an original state of the three-dimensional template, in that for example worn segments are eliminated. This step, which may take place either automatically, manually or manually with partial computer aid, allows the worn zones to be returned to their original state. Furthermore, optimization of the previous form on the basis of the latest knowledge may also take place in this step, which not only allows components to be replaced but also at the same time allows them to be optimized, for example in terms of flowing or cooling technology, as part of a service that is performed.

A further preferred embodiment is based on the fact that all the working steps of the process are carried out on a single machine tool or milling machine. Carrying out the entire process, i.e. measuring and subsequent production, on the same machine means that the same conditions also typically apply for the template and the component subsequently to be manufactured, which increases the accuracy of the component to be manufactured or the extent to which it matches the template. For example, the same clamping adapters are used for gripping the template and the subsequent blank or partially machined blank, and it is correspondingly possible to use the data determined in the measurement directly and essentially without any further calibration or adaptation to different ambient conditions. The machine tool or milling machine is preferably a 4-axis bench-type machine with additional first means for mounting the blank in two chucking setups and with second means for measuring the three-dimensional form and, if need be, the surface finish of a template or of the workpiece that is to be machined or has been (partially) machined.

Before the machining of the blank using said data, if need be after changing the data as described above, it is possible according to another preferred embodiment for clamping jaws for clamping or holding the partially machined blank in at least one clamping adapter in the first, finally machined region to be manufactured in a numerical control by the machine tool or milling machine. Since, for the manufacture of a spare part in only two chucking setups, typically special clamping adapters are required for mounting the partially machined blank in its region which has already been brought into its final, ready to use partial form, these can be manufactured in an automated manner and in a simple way for the production of such a small batch or individual piece on the basis of the measurement data before the production of the first spare part. In this way, such clamping adapters can be specifically adapted to the geometry of the templates, which allows better mounting of the partially machined blanks and in this way increases the precision of the finish workpieces and the manufacturing rate. It is preferably possible to chuck the template once again with these specifically produced clamping adapters and repeat the measuring operation again. In this way, the degree of matching between the template and the final component is further increased (matching of course only to the desired extent, i.e. apart from the worn zones that are to be made good).

Typically, the measuring of the spare part in the first step, i.e. the determination of the three-dimensional form and, if need be, also the surface finish of the three-dimensional template, and its numerical saving are carried out automatically by using a measuring probe and/or slit scanner. In an advantageous way, in the first step, for measuring the three-dimensional form and, if need be, also the surface finish of the three-dimensional template, the template is restrained at its ends in an A axis, which is present on the machine bench. Subsequently, the measurement is preferably carried out in multiple stages using different rotational positions of this A axis, in order to create the three-dimensional form completely and, if need be, with redundancy permitting automatic corrections. Preferably, in a second step of the measurement, the template is subsequently grasped in its central region by means of clamping adapters, and the tip and root regions of the template are measured in this clamped position. Of course, it is equally possible to change over the sequence of these two measuring steps, i.e. initially to measure the tip or root portion and subsequently the central region.

If the template takes the form of large objects, such as for example a moving blade or stationary blade that is to be replaced of a gas turbine or steam turbine, with for example a length in the range of more than 200 mm, lever forces that occur in the machining have to be taken into account. Correspondingly, it is advantageous to adopt the procedure that, in the second step, the blank is grasped in an A axis of the machine bench, in that the blank is grasped at at least one end by means of a special clamping adapter and is fixed at the other end by means of a movable tailstock. The A axis is advantageously horizontally arranged. Subsequently, the central region of the blank is brought into its final, ready to use partial form. Then, in the third step, the partially machined blank is grasped on defined clamping surfaces in a W axis of the machine bench by clamping jaws, if need be specifically manufactured for the specific blade. The W axis is advantageously vertically arranged. Furthermore, in this third step, the partially machined blank is typically grasped by two pairs of clamping jaws. Subsequently, the tip and root regions are brought into their final, ready to use partial form.

If, alternatively, the template takes the form of rather smaller objects, such as for example a moving or stationary blade that is to be replaced of a gas turbine or steam turbine, with for example a length in the range of less than 200 mm, it is also possible to adopt the reverse procedure. Correspondingly, in the second step, the blank is grasped by clamping jaws (typically a pair) in a W axis of the machine bench, and subsequently at least a tip or root region is brought into its final, ready to use partial form. Following this, in the third step of the process, the partially machined blank is grasped in an A axis of the machine bench, in that the blank is grasped at at least one end that has already been brought into its final, ready to use partial form by means of a special clamping adapter, if need be specifically manufactured for the specific blade, and optionally fixed at the other end by means of a movable tailstock. Subsequently, the central region and, if need be, the remaining tip or root region is brought into its/their final, ready to use partial form.

The present invention also relates to an apparatus for carrying out a process such as that described above. The apparatus is essentially characterized in that the machine tool or milling machine is a 4-axis machine, on the machine bench of which at least one A axis is provided in an essentially horizontal alignment for the clamping of a workpiece, this A axis being supplemented by a movable tailstock. This tailstock is preferably mounted on a compound table and, depending on the size of the template or the corresponding blank, can preferably be fixed in different basic positions of the tailstock base plate, so that the distance between the clamping mechanism of the A axis and the tailstock can be set according to needs. Also provided on its machine bench is at least one W axis of essentially vertical alignment, which in particular preferably has exchangeable clamping adapter jaws. The A axis also preferably has in particular exchangeable clamping adapter jaws, in order to allow means specifically adapted to blade geometries that are to be produced to be provided for their mounting. Such an apparatus may be manufactured for example in a retrofit on the basis of a standard 4-axis machine.

BRIEF DESCRIPTION OF THE DRAWINGS

The invention is to be explained in more detail below on the basis of exemplary embodiments in conjunction with the drawings, in which.

DETAILED DESCRIPTION OF THE PREFERRED EMBODIMENTS

I. Machine Construction

Figure 1:
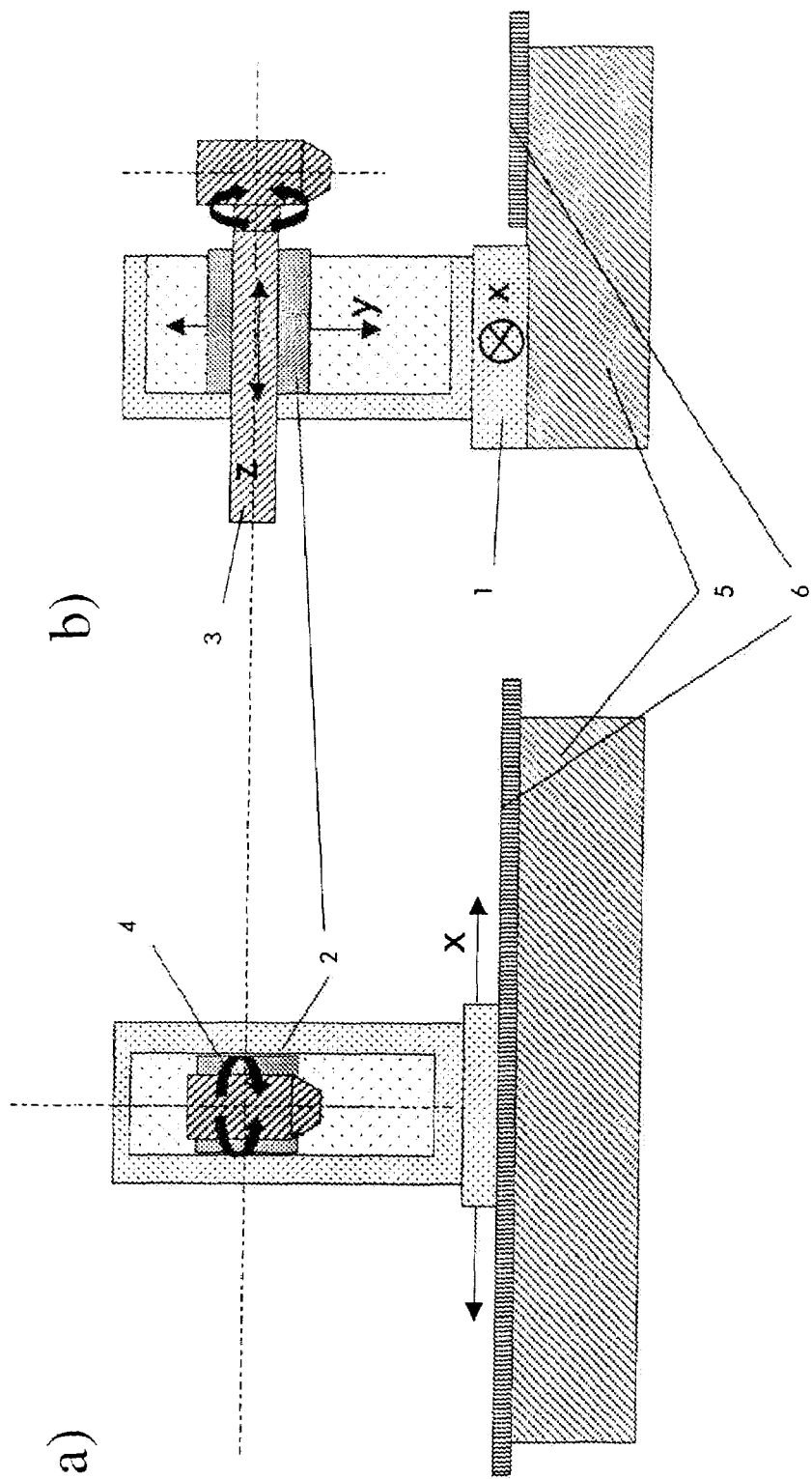
FIG. 1 shows the construction of a 4-axis bench-type machine (basic machine) according to the prior art.

The machine construction requires a so-called double-place machine with NC tailstock center. A conventional 4-axis flatbed NC machine (for example CHIRON, Mill 2000) may be used as the basic machine. Such a machine is represented by way of example in FIG. 1. It comprises a machine bed 5, on which a machine bench 6 is arranged. The movable construction is mounted on the machine bench 5. The movable construction comprises an X-axis slide 1, which allows displaceable mobility of the entire construction in a horizontal direction. Also arranged is a Y-axis slide, which allows displaceable mobility in a vertical direction. Arranged on this Y-axis slide 2 is a Z-axis slide 3, which permits displaceable mobility in a horizontal direction orthogonally in relation to the X axis. Arranged on this Z-axis slide 3 is the rotational axis 4 of the spindle, which permits additional rotation of the machine tool about the Z axis. Typically, this permits a rotation by +/−100 degrees.

Figure 2:
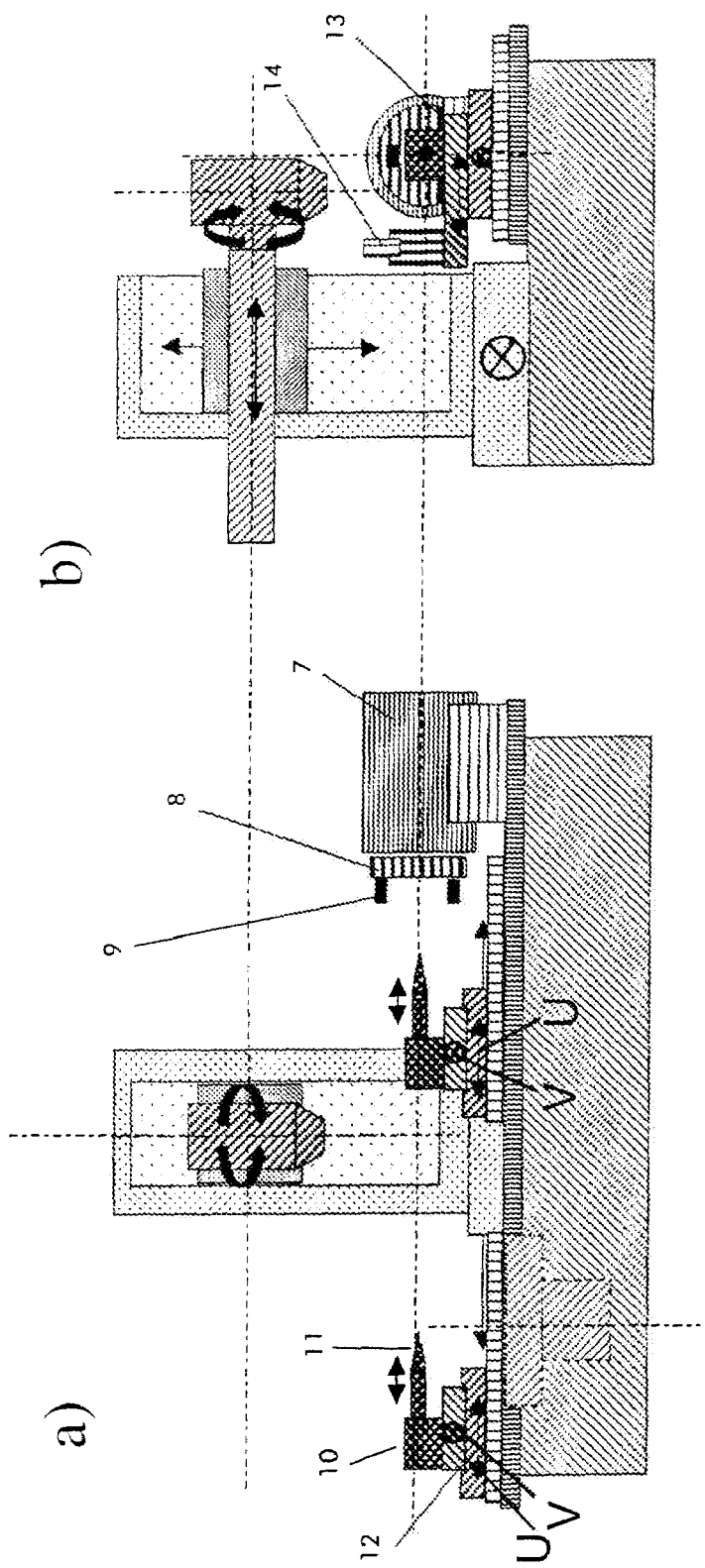
FIG. 2 shows an expanded 4-axis bench-type machine, a) in a front view, b) in a side view.
Figure 3:
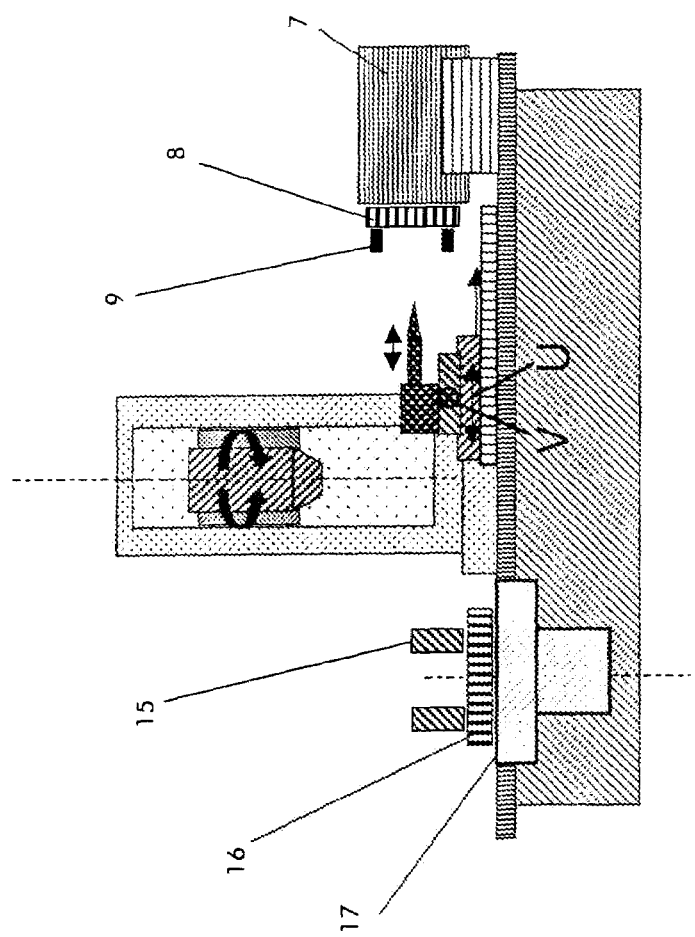
FIG. 3 shows an expanded 4-axis bench-type machine in a view according to FIG. 2b), an additional W axis also being provided on the machine bench.
Figure 5:
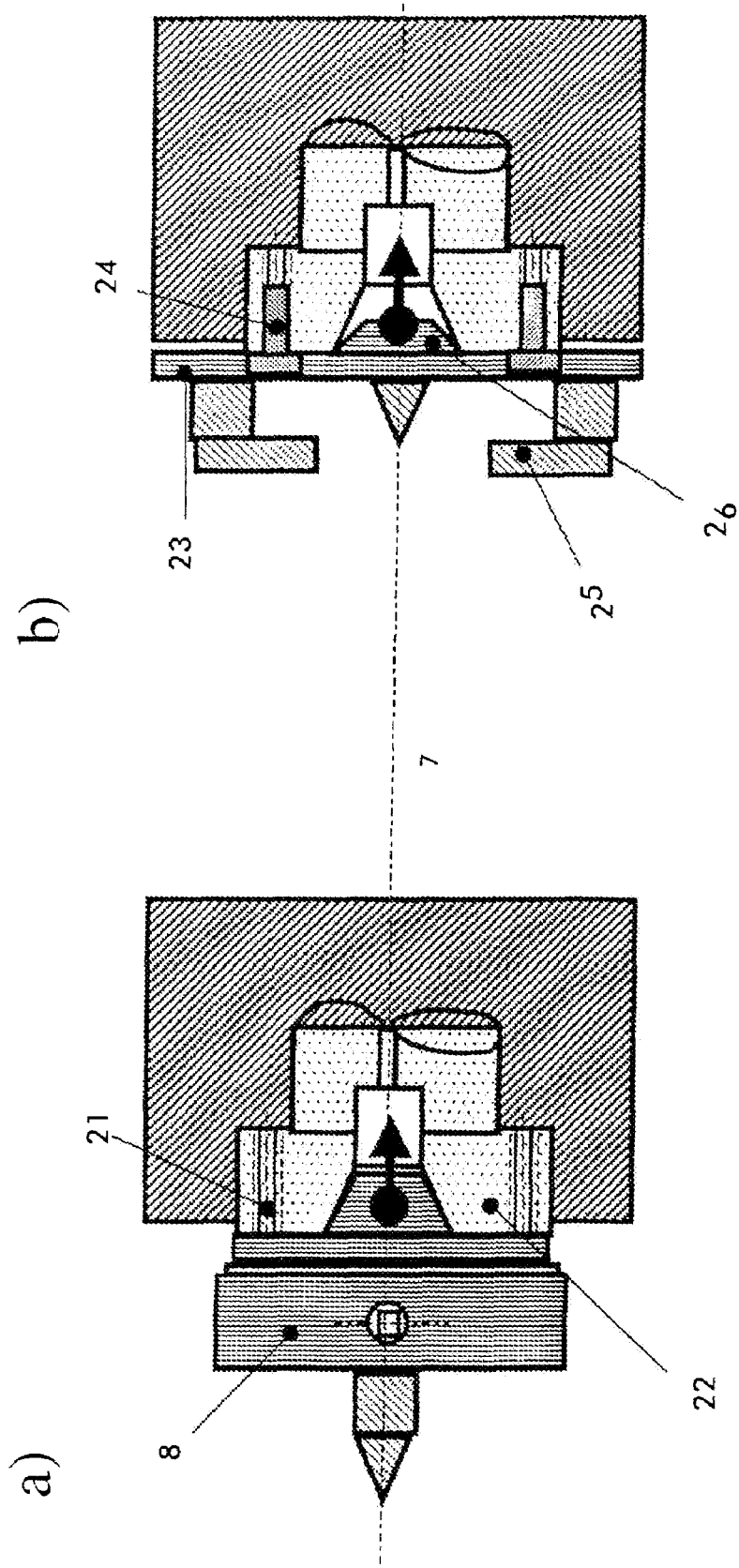
FIG. 5 shows spindles for the A axis, a) spindle with normal A-axis clamping adapter with exchangeable jaws, b) spindle with extra-wide, screwed flange for receiving large clamping systems.

Such a standard 4-axis flatbed NC milling machine (for example CHIRON Mill 2000) is to be retrofitted as follows (cf. in this respect FIGS. 2, 3, 5) for automated service blade manufacture (blade with "unknown" geometry):

1. Mounted on one side of a flatbed bench is an A axis (NC rotational axis) 7. The spindle of this NC rotational axis is to be equipped with a clamping interface 8/22, preferably HSK 80, with great planar contact, typically 100 mm in diameter. At least three, better four, internally threaded bores 21 are to be provided in the outer flanges of this HSK clamping interface. Cf. in this respect FIG. 5. Then, depending on the blade size, standard clamping adapters 8 with exchangeable camping elements/jaws are received in this clamping interface. For receiving large blades, a flange plate 23 is fitted onto the clamping interface and securely screwed by means of screws 24 in the internal threaded bores 21. A large blade clamping device 25 can then be mounted on this flange plate.

2. By exchanging the clamping adapters 8/25, a blade size adaptation is possible (preferably three variants).

3. By exchanging the camping elements/jaws, an adaptation to different blade root geometries, including cast geometries, is possible.

4. In front of the A axis 7, an NC compound table with an NC tailstock 10 is mounted with a tailstock center 11 on a displaceable, fixed and clamped base plate.

Figure 4:
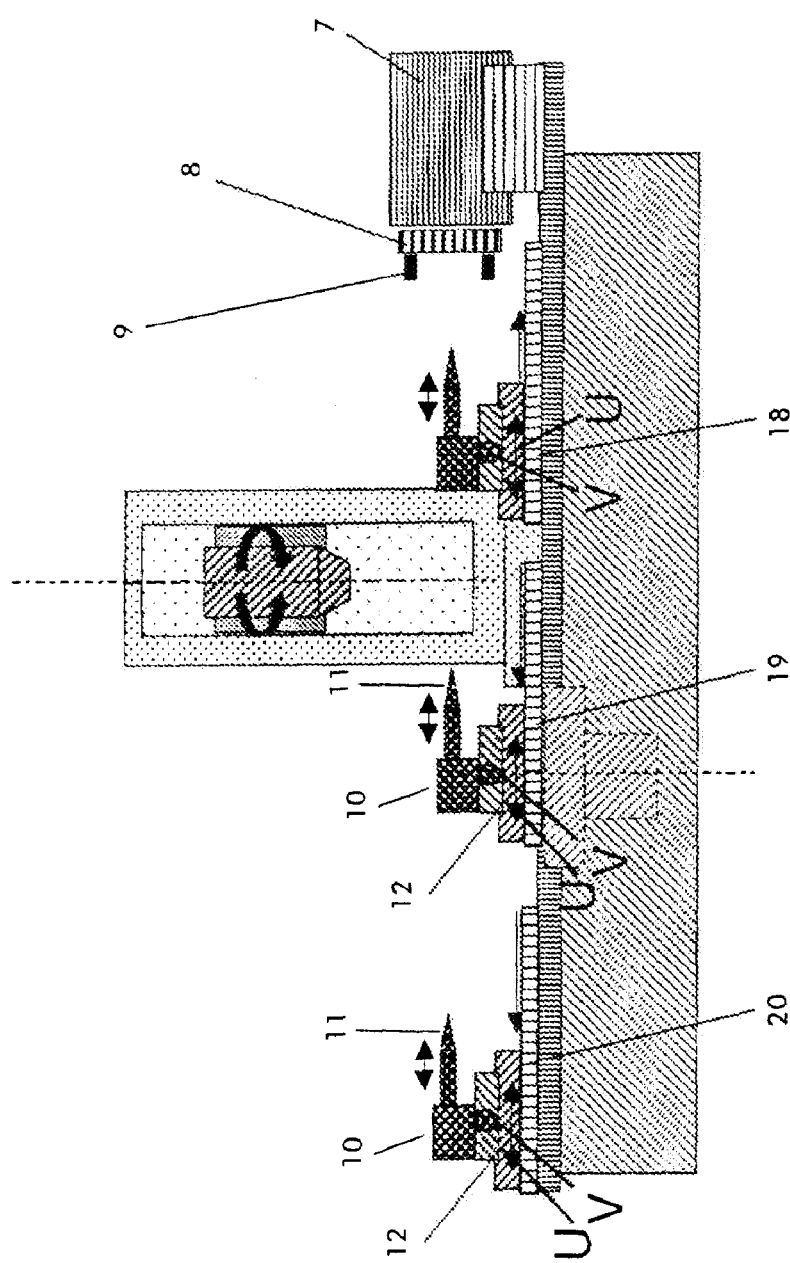
FIG. 4 shows a representation according to FIG. 2b), the basic positions for the tailstock base plate for different blade lengths being represented.

5. By moving this base plate into defined positions on the bench plate, service blades of a length of between 5 mm and 1800 mm can be manufactured on this machine. This is represented by way of example in FIG. 2 and in particular in FIG. 4. In FIG. 4, 3 different basic positions of the tailstock base plate are represented. A first position 18, in which small blades with a blade length of 5 to 500 mm in length can be machined. In a second, middle position 19, blades of a length of 500 to 1000 mm in length can be machined, and in the third position 20 large blades, with a length of in the range from 1000 to 1500 mm in length can be measured and subsequently manufactured.

6. The NC compound table allows by its NC U axis 12 any desired fine adjustment between the defined positions indicated, so that all blade lengths can be accommodated.

7. The NC tailstock 10, with which the clamped blade blank 38 is fixed in relation to the A axis 7, is mounted at the front on the NC transverse axis of the compound table (V axis, cf. in this respect FIG. 2). Mounted at the rear is a tipping handling system, with the aid of which the blade blank is brought from the W axis 17 into the A-axis clamped position, or vice versa. This unit may also be carried out by external handling or be omitted if this function is manually carried out.

8. An NC rotary axis (W axis 17) is integrated onto/into the right-hand flatbed bench plate. Cf. in this respect FIG. 3 in particular. A standard clamping element 16 is mounted on this rotary axis. By exchanging the clamping elements/jaws 15, both service blades 28 for initial root and/or tip machining, finish-machining or measurement and blanks 38 can be clamped here (perpendicularly or transversely).

9. The machine must be equipped with a second measuring system for measuring with a probe 29, scanner 30 and surface quality determination.

10. The (laser) slit scanner 30 is stationed like a tool and like the measuring probe 29 in the tool magazine of the machine. The data transmission takes place by radio or via an infrared interface.

11. Before a measuring operation begins, the slit scanner 30 or measuring probe 21 is changed by the tool changer into the milling spindle and activated.

II. Data Acquisition/Obtainment and Data Preparation of Service Blades

Figure 6:
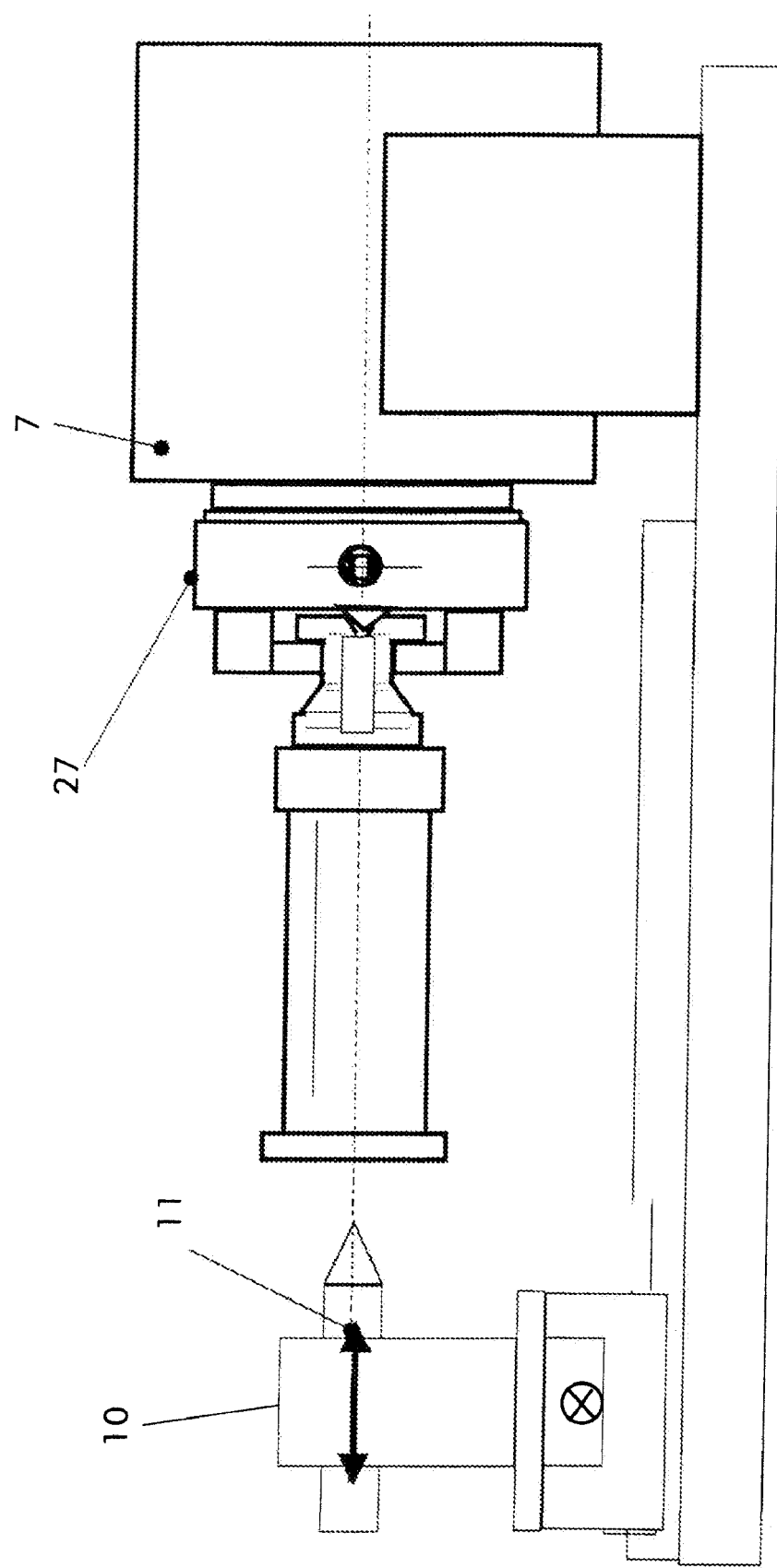
FIG. 6 shows a representation of the first working step, clamping service blade in special clamping adapter.
Figure 7:
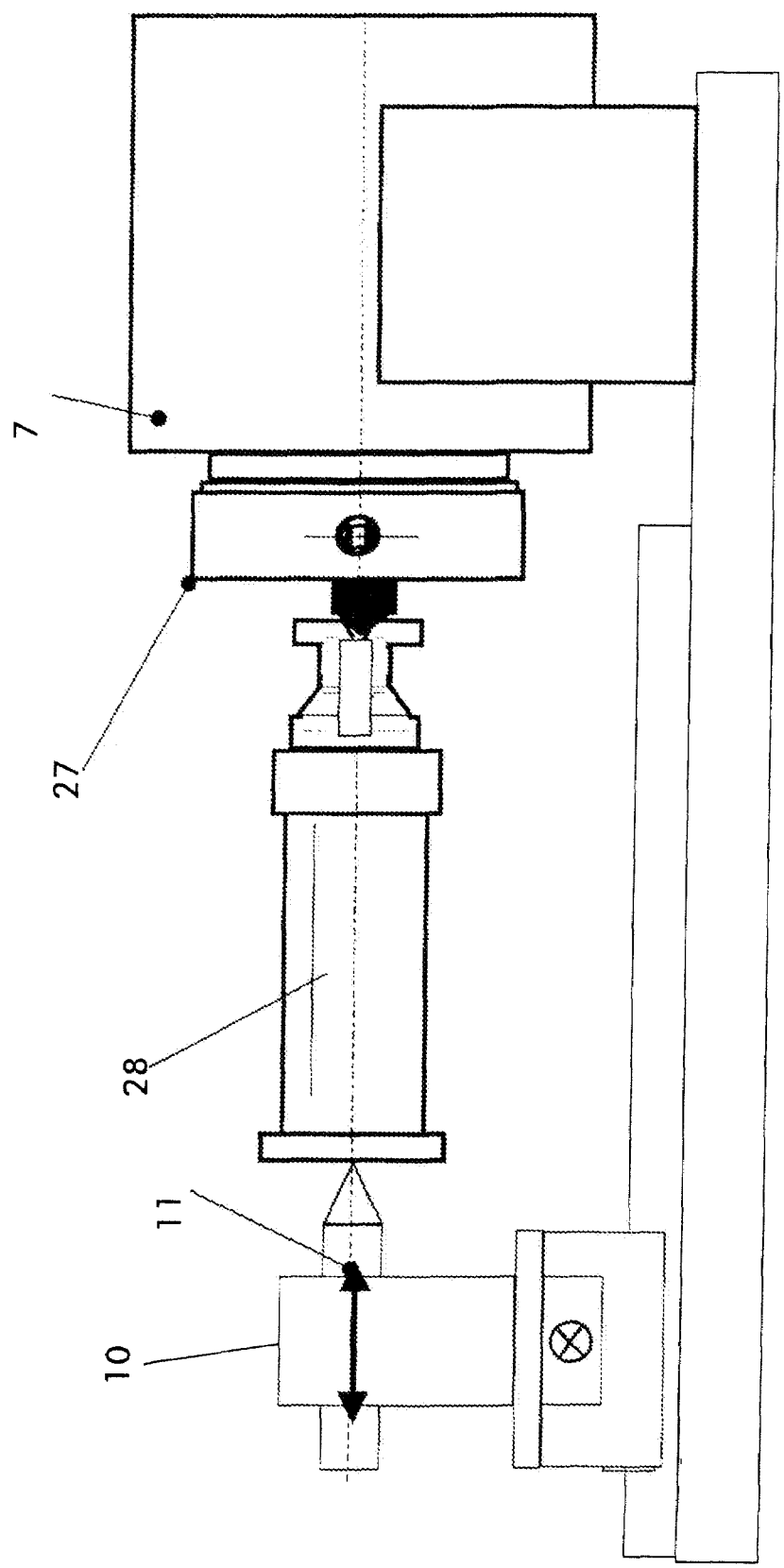
FIG. 7 shows a representation of the first working step, alternative, service blade clamping between centers.

1. A service blade 28 (with or without worn segments) with a known or unknown contour is received in the A-axis clamping system 27 for measurement (as represented in FIG. 6) or clamped by means of center points or clamping pins between the A axis 7 and the tailstock 10 (as represented in FIG. 7).

Figure 8:
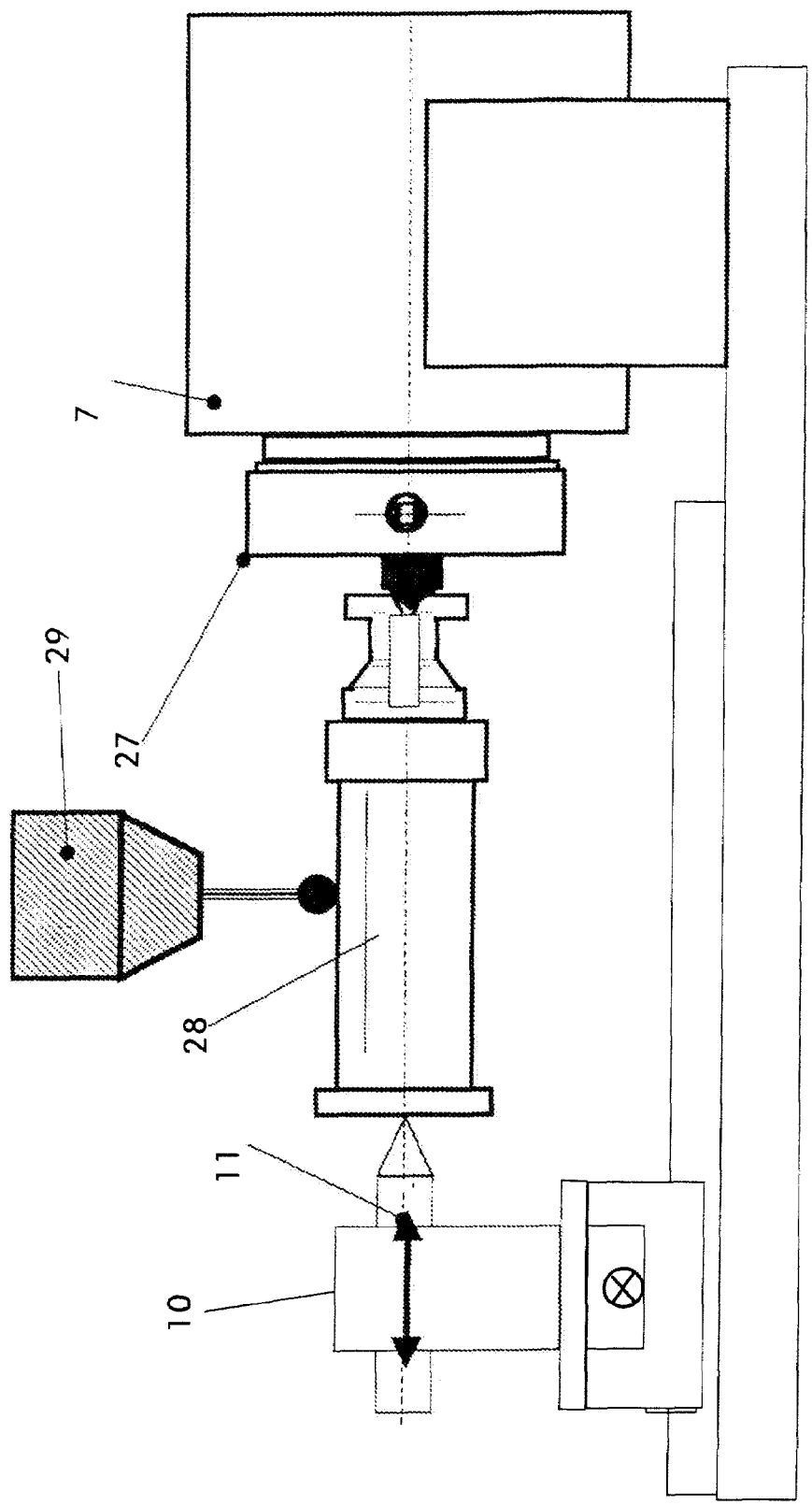
FIG. 8 shows a representation of the second working step, rough functional region measurement with measuring probe.

2. Subsequently, the functional region limits of the blade, such as for example the tip, root and airfoil regions, are roughly determined with a measuring probe 21 (cf. in this respect FIG. 8). From these key regional data, the limits and the fine measuring strategy to be chosen for the fine measurement by means of a standard slit scanner 30 are fixed. This item may also be omitted if a similar blade is known in the CAD-CAM system.

Figure 9:
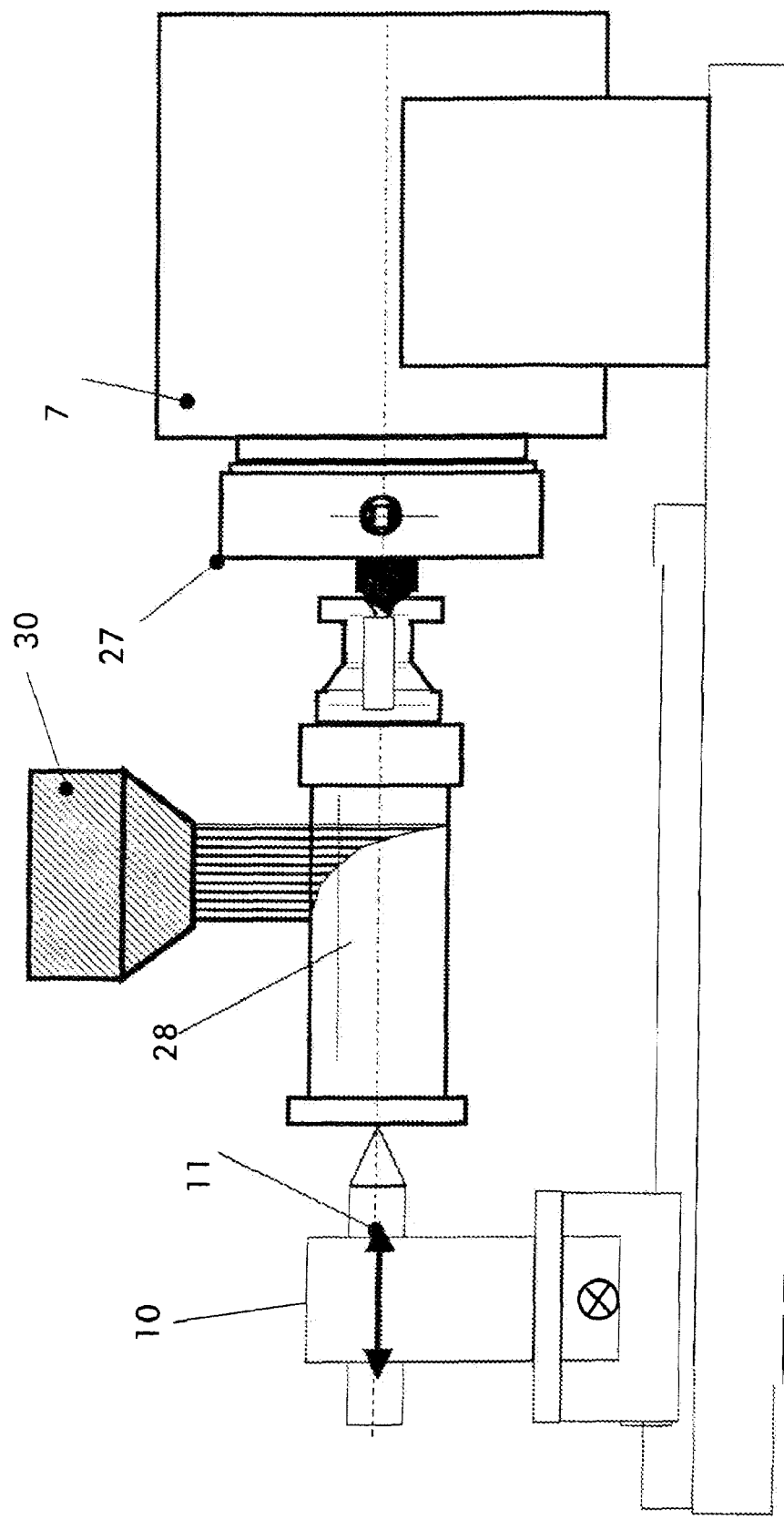
FIG. 9 shows a representation of the third working step, fine scanning by means of a slit scanner in the X direction.

3. By means of the determined regional limits and the fixed fine measuring strategy, the complete blade geometry is then measured in the X direction by means of the standard slit scanner 30 (cf. in this respect FIG. 9). The distance between the slit scanning planes is a function of the required final accuracy within the functional regions, and lies between 0.1 mm and 5 mm. For example, scanning is performed more finely at radii transitions than in the long channel surfaces.

Figure 10:
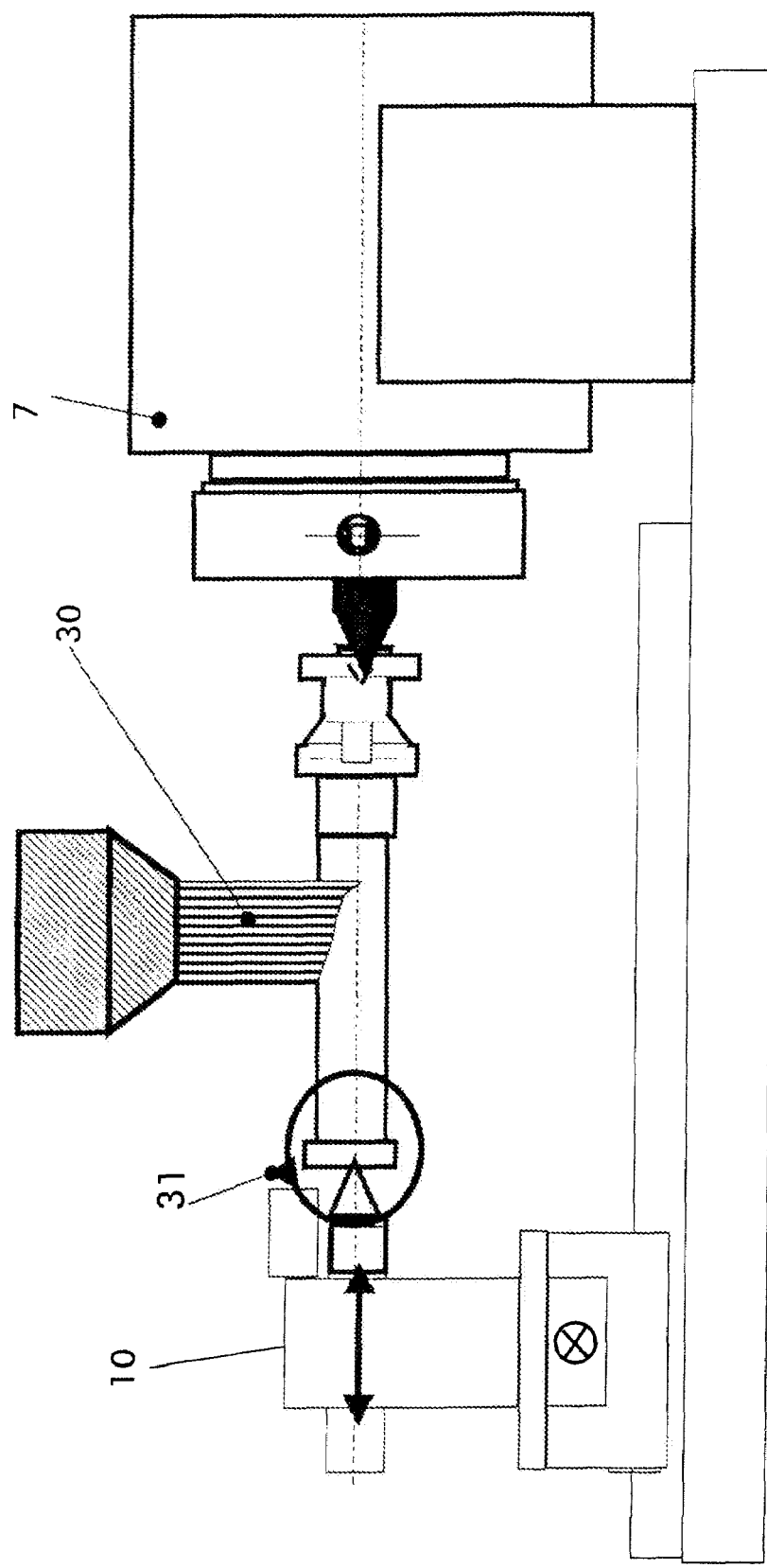
FIG. 10 shows a representation of the working steps 4 and 5, fine scanning by means of a slit scanner at different angular positions of the blade.

4. After completion of this scanning plane, the blade 28 is brought into another angular position 31 by turning of the NC A axis 7. After that, the scanning process of item 2 is repeated (cf. in this respect FIG. 10).

5. The scanning operation is carried out up to 5 times, depending on the accuracy requirement, 3 times being normal (maximum angular rotation 120°. For finer resolution, smaller angle dividers).

Figure 11:
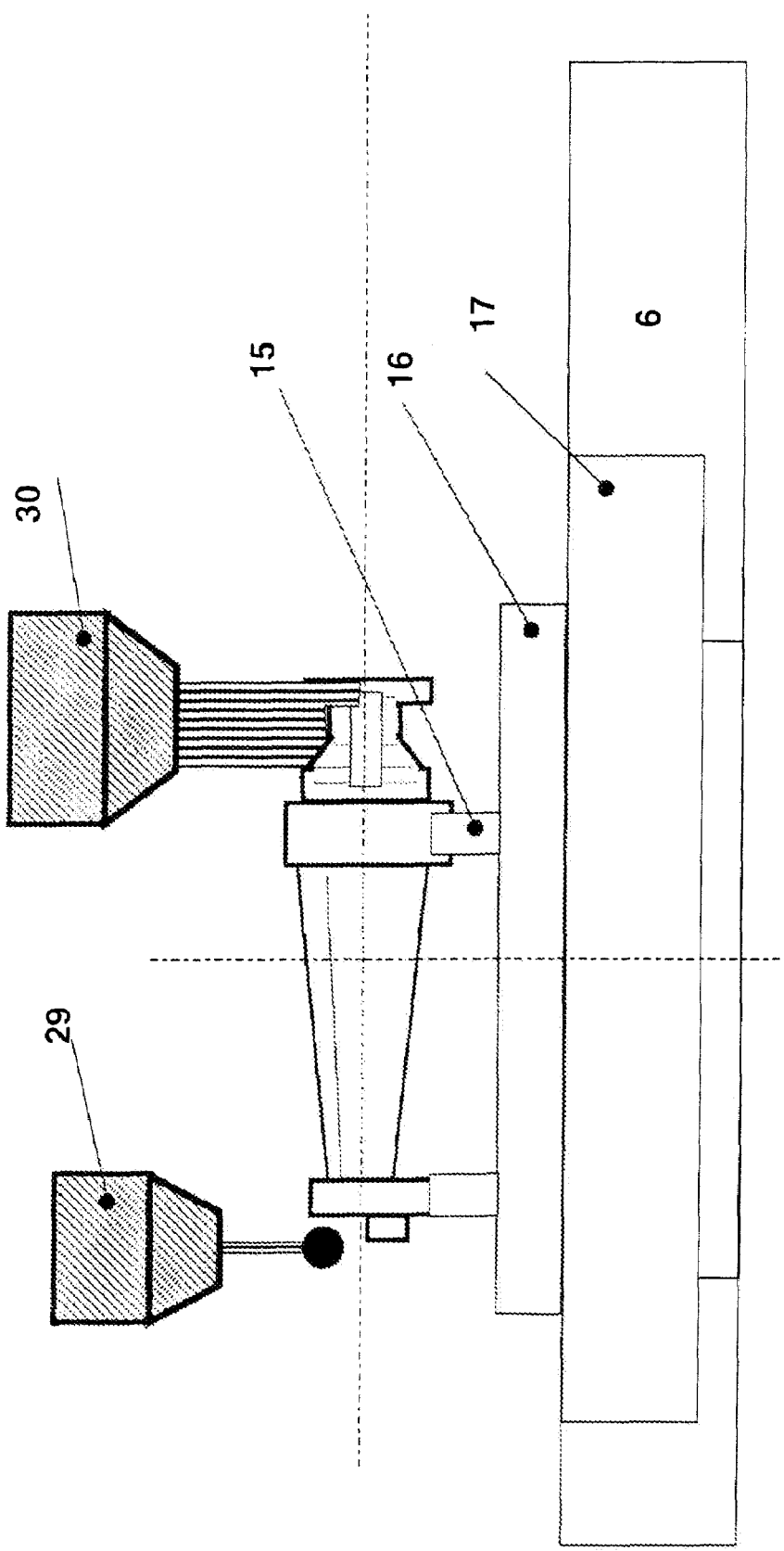
FIG. 11 shows a representation of the sixth working step, rough measurement of the tip and root regions on the W axis.
Figure 12:
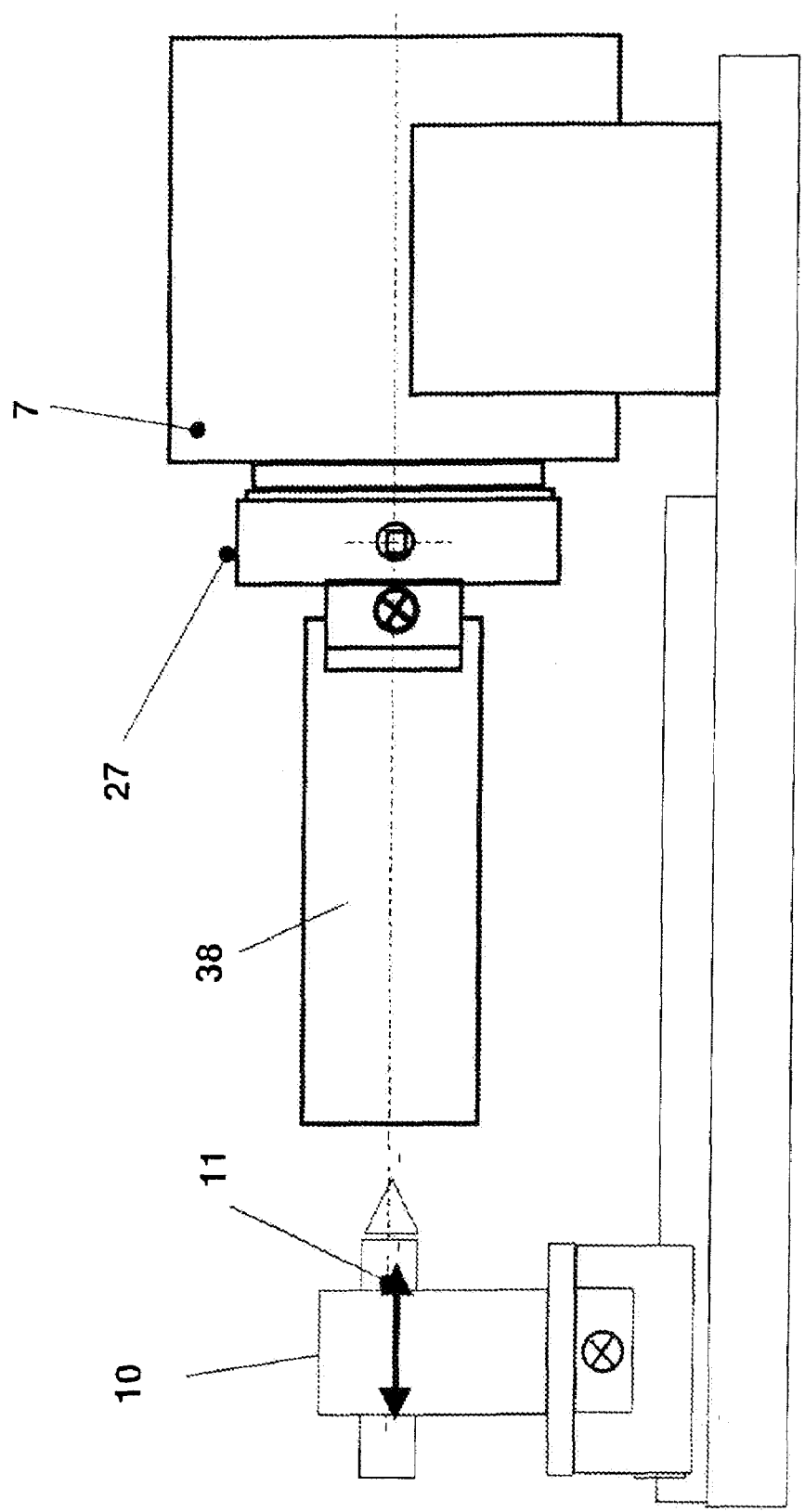
FIG. 12 shows production of a large blade, first step, clamping of the solid rectangular blank.
Figure 13:
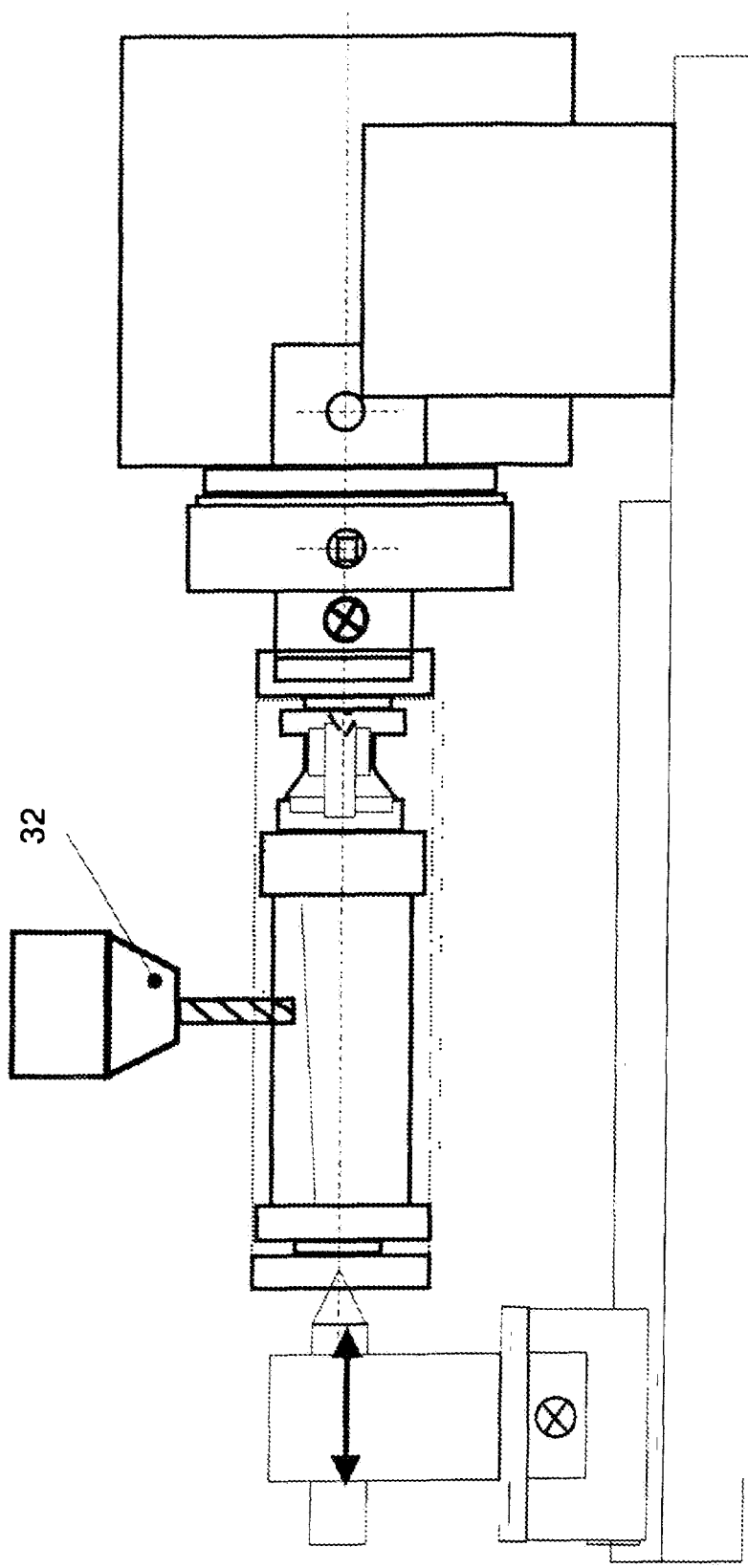
FIG. 13 shows production of a large blade, second step, milling of the central region.

6. In the case of blades on which it has not been possible to determine the tip and/or root contour in measuring positions 2-5, they are brought onto the W axis (horizontal), into an auxiliary clamping device, for the exact determination of the root and tip proportions. Cf. in this respect FIG. 11. Subsequently, the complete root and tip geometry is roughly measured by means of a measuring probe 29 and finely measured by means of the standard slit scanner 30. To be able to measure the root portion and the tip portion in this chucking setup, the W axis is turned by 180°.

7. The scanning measuring planes are then prepared in a CAD system in such a way that the blade geometry of the old service blade 28 is created.

8. After that, a revision of the service blade geometry data takes place, with the aim of eliminating all the worn segments of the blade. In this way, the geometry of the new service blade is created.

9. Once the data have been determined for all the rows of blades of a turbine, an optimization of the flow channel can also be additionally carried out and the new blade geometry data determined.

10. For these new service blades, determined in this way, the NC programs for:

10.1 the processing by milling, drilling and rotary milling
10.2 measuring the finished blade
10.3 manufacturing (milling) the clamping element/jaw contour
10.4 and blade root, tip finish-machining are prepared (cf. in this respect section III further below).

III. Mechanical Production of the New Service Blades

A distinction can be drawn between the two following working steps for the manufacture of a new service blade. Both sequences can be carried out on the machine described under item II.1.

III.1 Production Sequences for Short Service Blades
(suitable for short blades <200 mm, cf. in this respect FIGS. 17-22)

1. For the determination of the old service blade geometry, the working steps according to section II. are carried out.

2. The acquired measurement data are then prepared in a CAD system in such a way that the root and tip geometry of the old service blade is created.

3. After that, a revision of the root and tip geometry of the old service blade takes place, with the aim of eliminating all the worn segments of these portions. In this way, the final geometry of the root and tip geometry is created.

4. By means of the final geometry of the root portion, an NC program for the manufacture of clamping jaws for clamping this root portion is produced.

5. By means of the program, in the first step a set of clamping jaws 27 with which the root portion of the service blade to be produced can be received in a defined manner in the A-axis clamping unit is manufactured on the A-axis clamping unit.

6. The service blade is clamped in this A-axis clamping unit.

7. The old service blade geometry (remaining contours of the blade) is determined and prepared in the way described in sections II.2 to II.7.

8. After that, the required NC milling and measuring programs (items of II.10.1 to II.10.4) for the new service blade are produced.

9. Production sequence for creating the auxiliary clamping surfaces 9.1 With the aid of the NC program produced under item II.1-4, the auxiliary clamping surfaces of the parallel jaw chuck for receiving the root Geometry are manufactured.

9.2 The auxiliary clamping jaws are then mounted in the appropriate clamping adapters of the A axis and their position is measured.

10. Production sequence for manufacturing a new service blade

Figure 17:
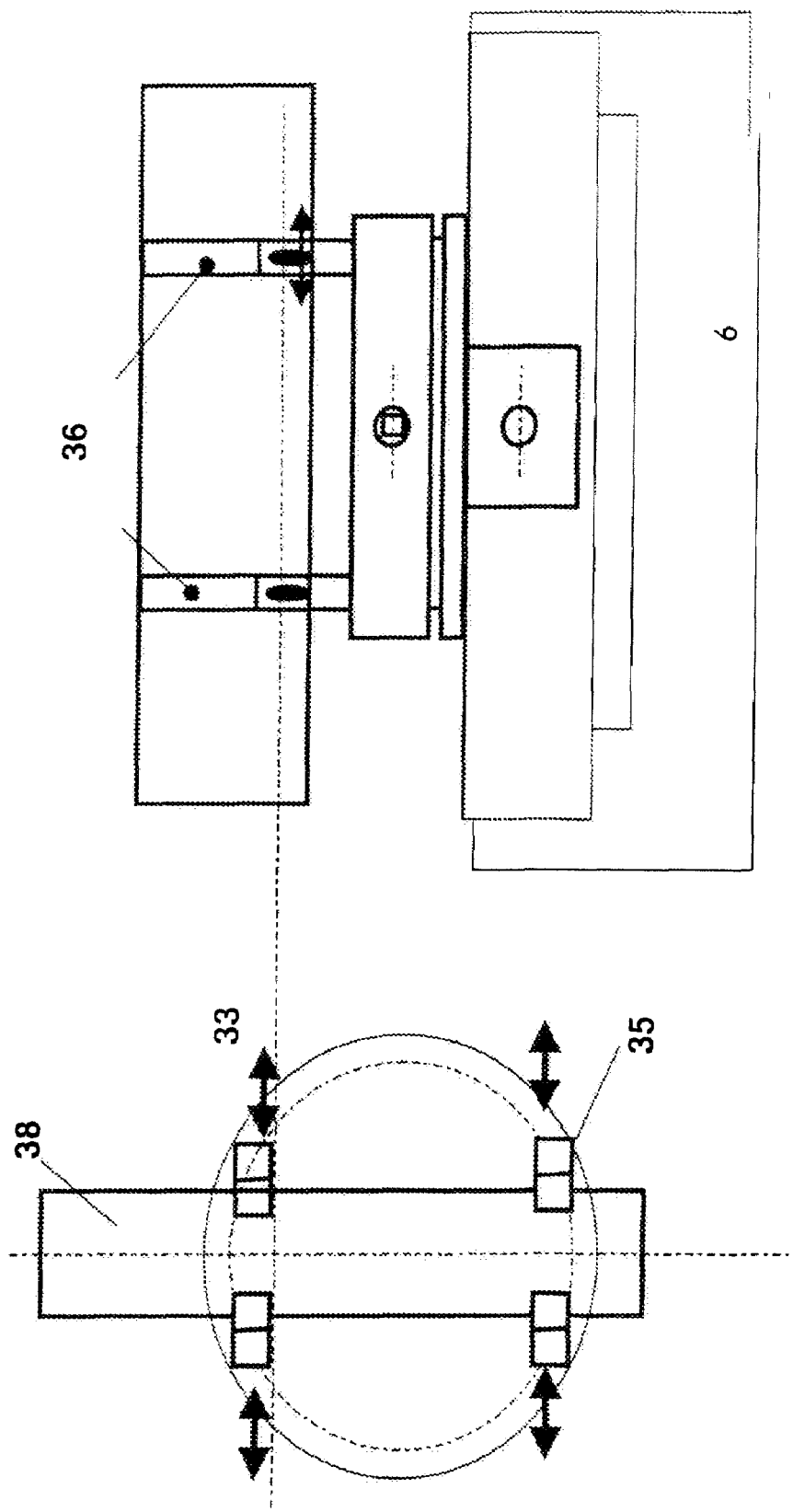
FIG. 17 shows production of a small blade, first step, clamping of the solid rectangular blank on the W axis.

11. The blank 38 is clamped in the W-axis clamping unit 16 (FIG. 17).

Figure 18:
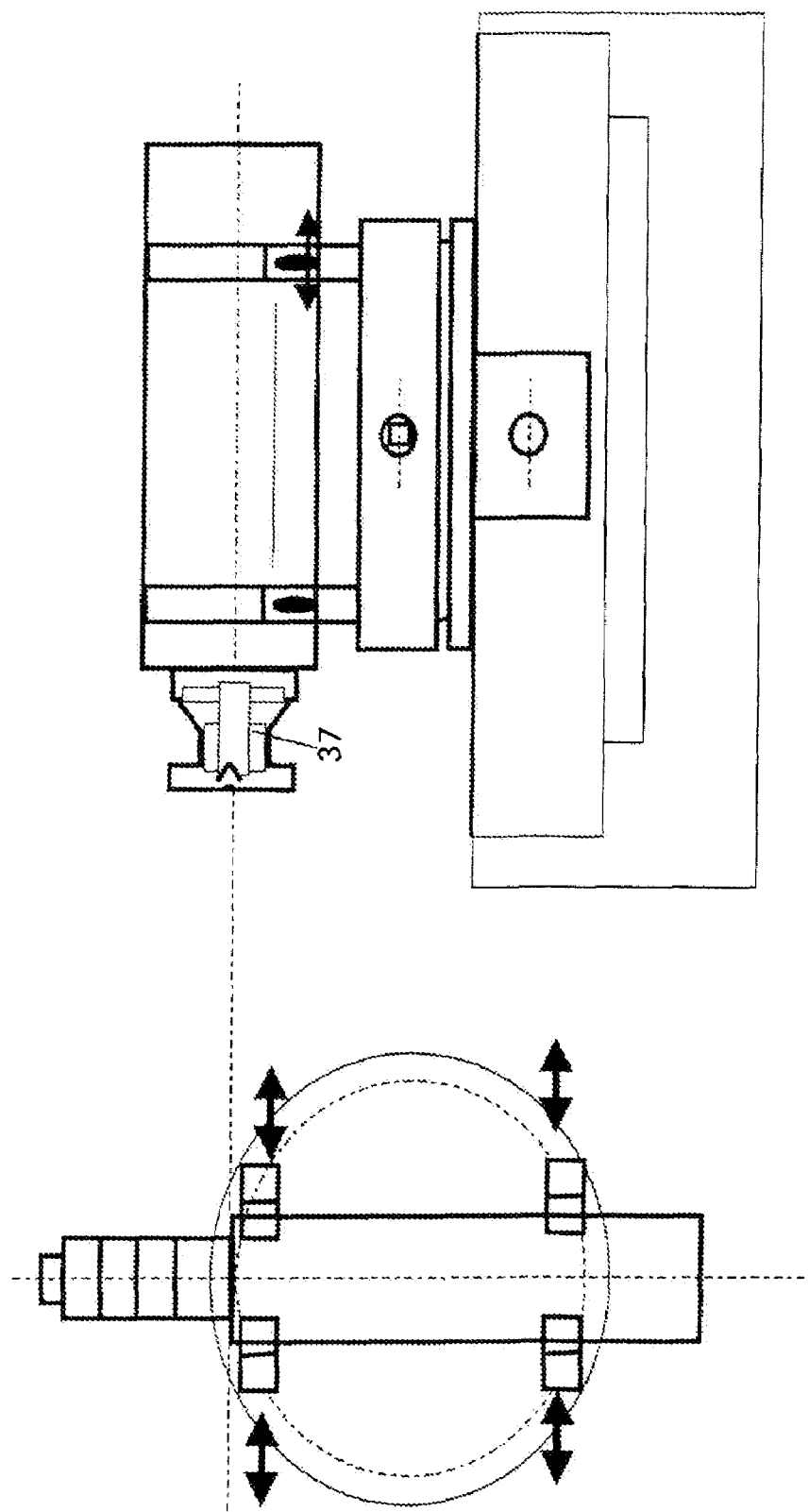
FIG. 18 shows production of a small blade, second step, manufacture of the complete root portion.

12. By means of the NC milling program produced in item II.10.4, the complete root geometry plus a turning clamping surface is manufactured (FIG. 18).

13. By means of the NC measuring program produced in item II.10.2, the manufactured root geometry is measured.

14. If not according to specification:—NC milling program optimization—

Figure 19:
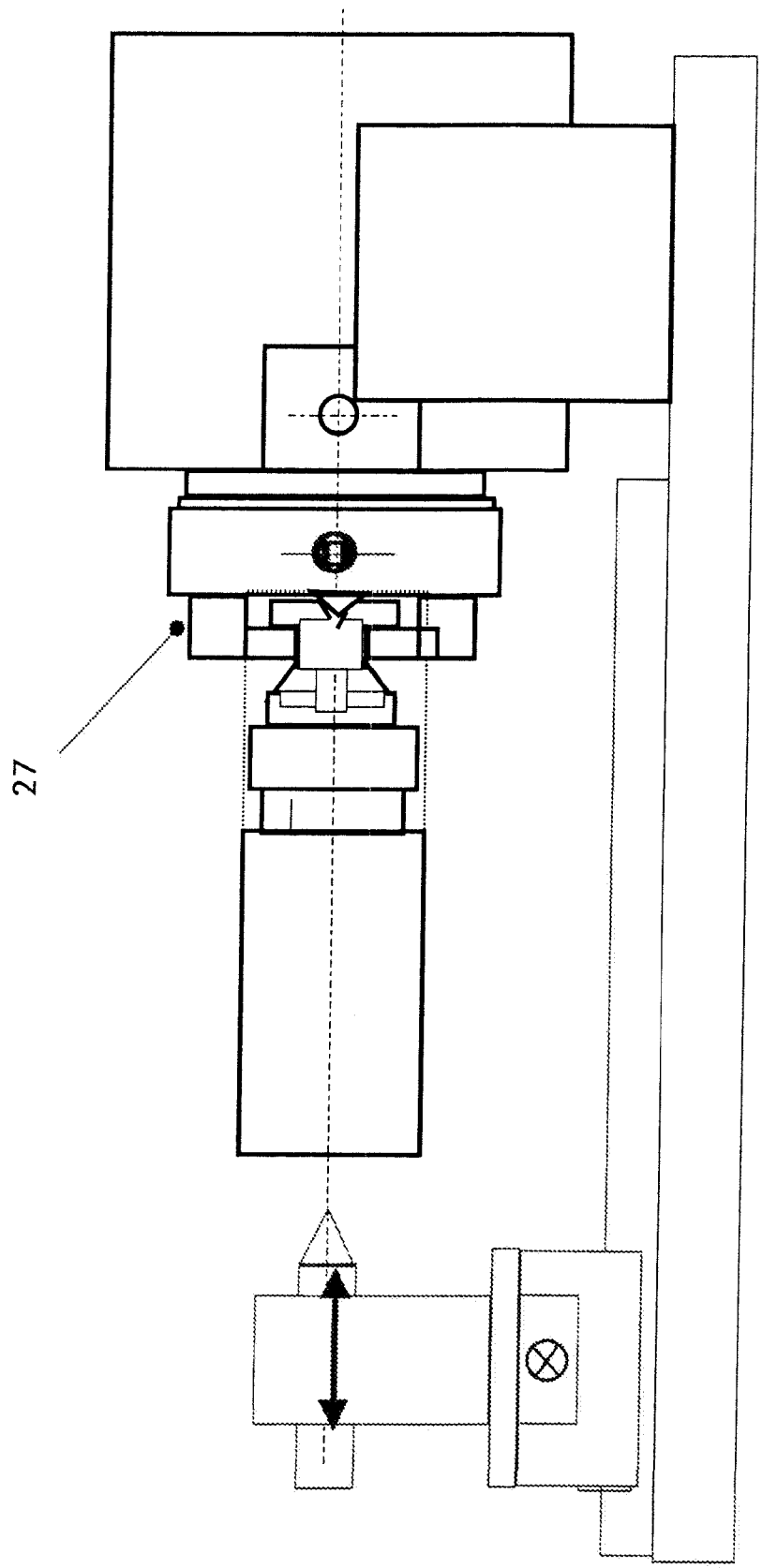
FIG. 19 shows production of a small blade, third step, clamping of the service blade in the A axis.
Figure 20:
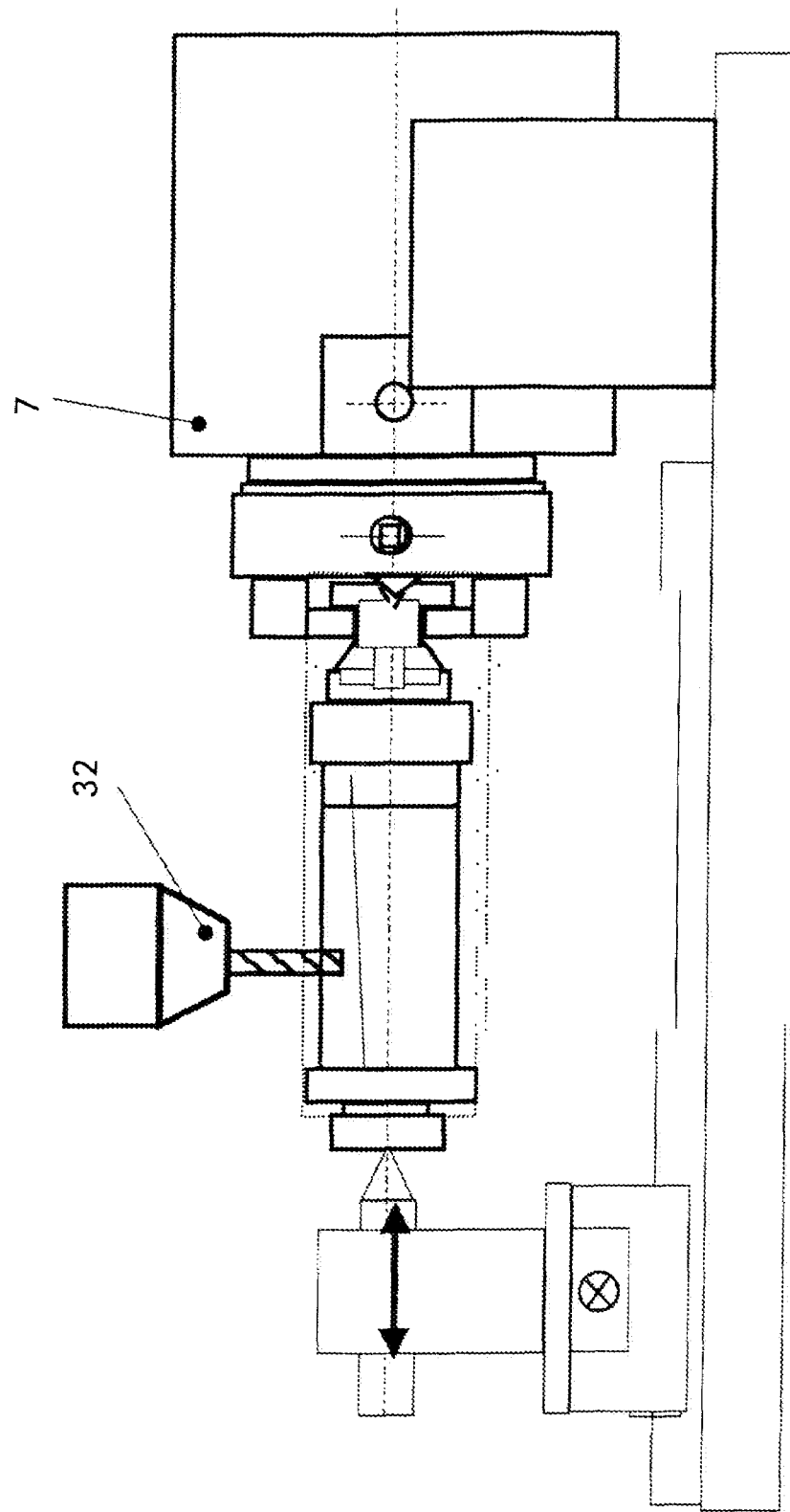
FIG. 20 shows production of a small blade, fourth step, milling of the channel and tip geometry.
Figure 21:
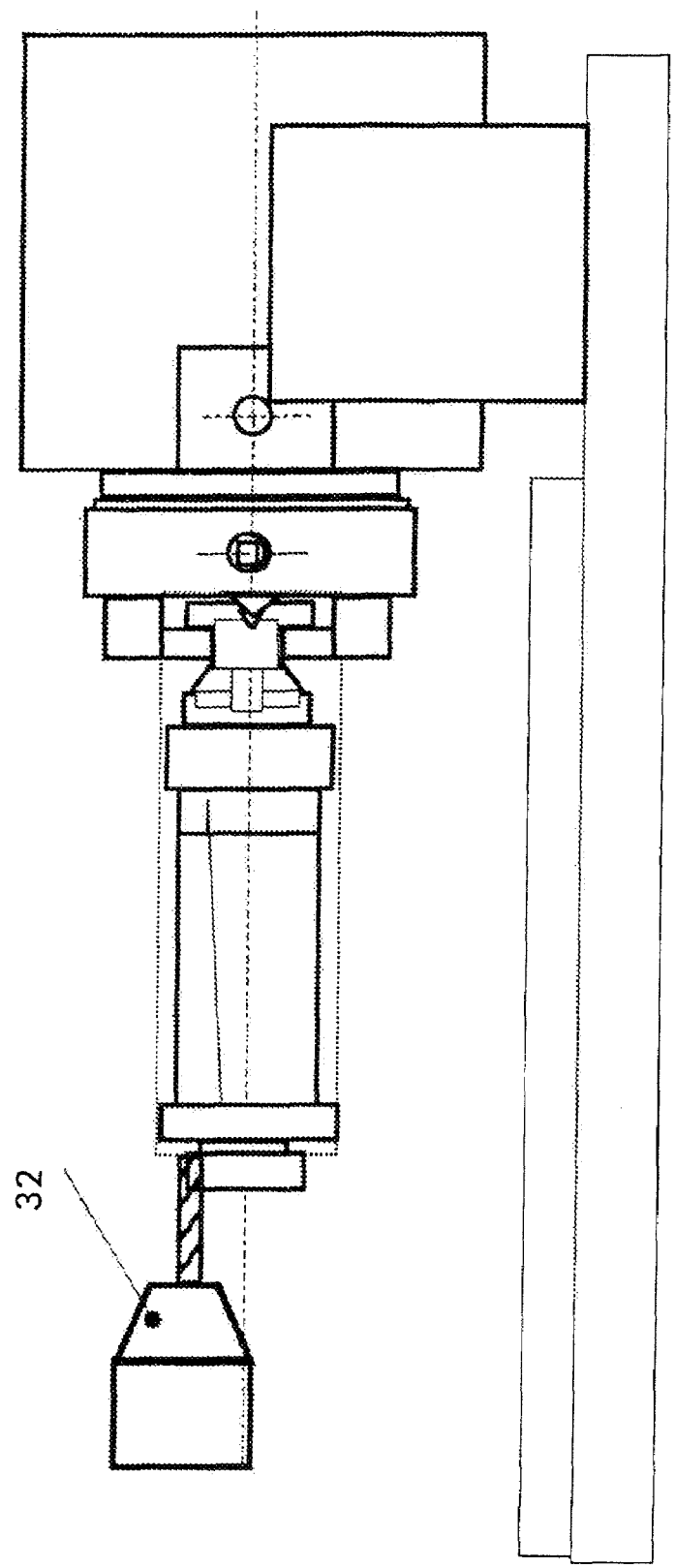
FIG. 21 shows production of a small plate, fourth step finish-machining of the tip geometry.
Figure 22:
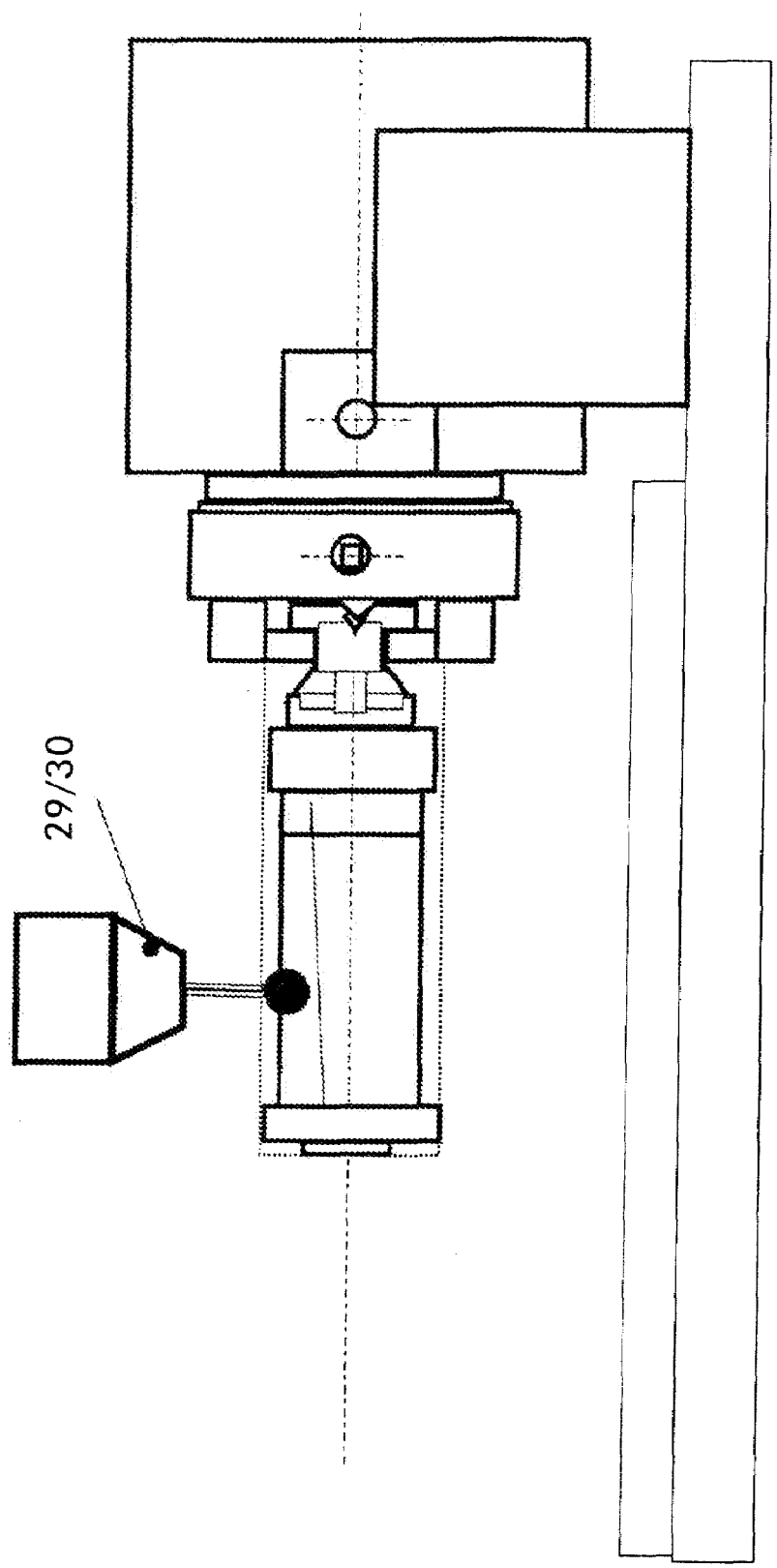
FIG. 22 shows production of a small blade, third step, measuring of the remaining blade geometry.
Figure 23:
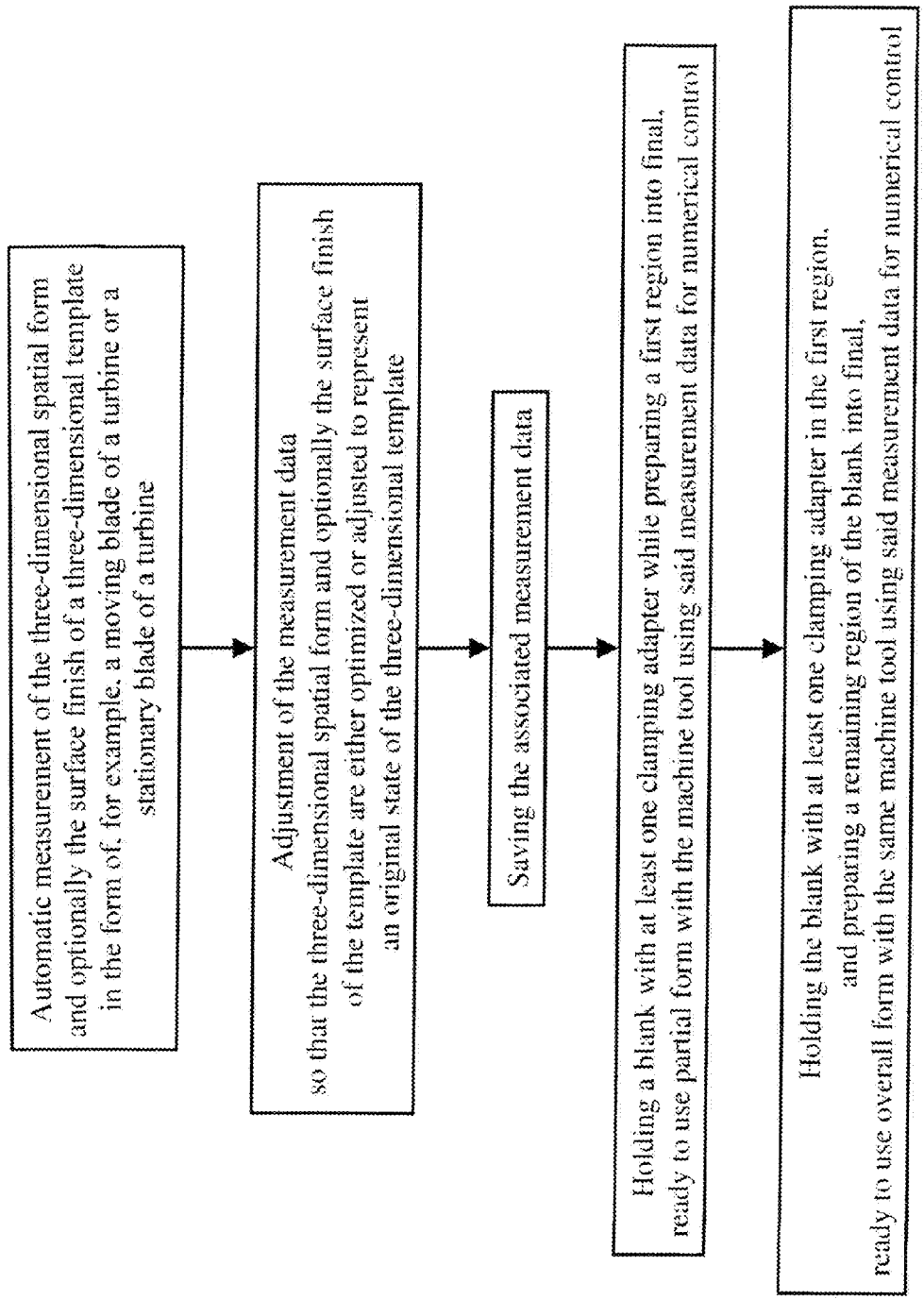
FIG. 23 shows a flow diagram of an exemplary method according to the invention.
Figure 24:
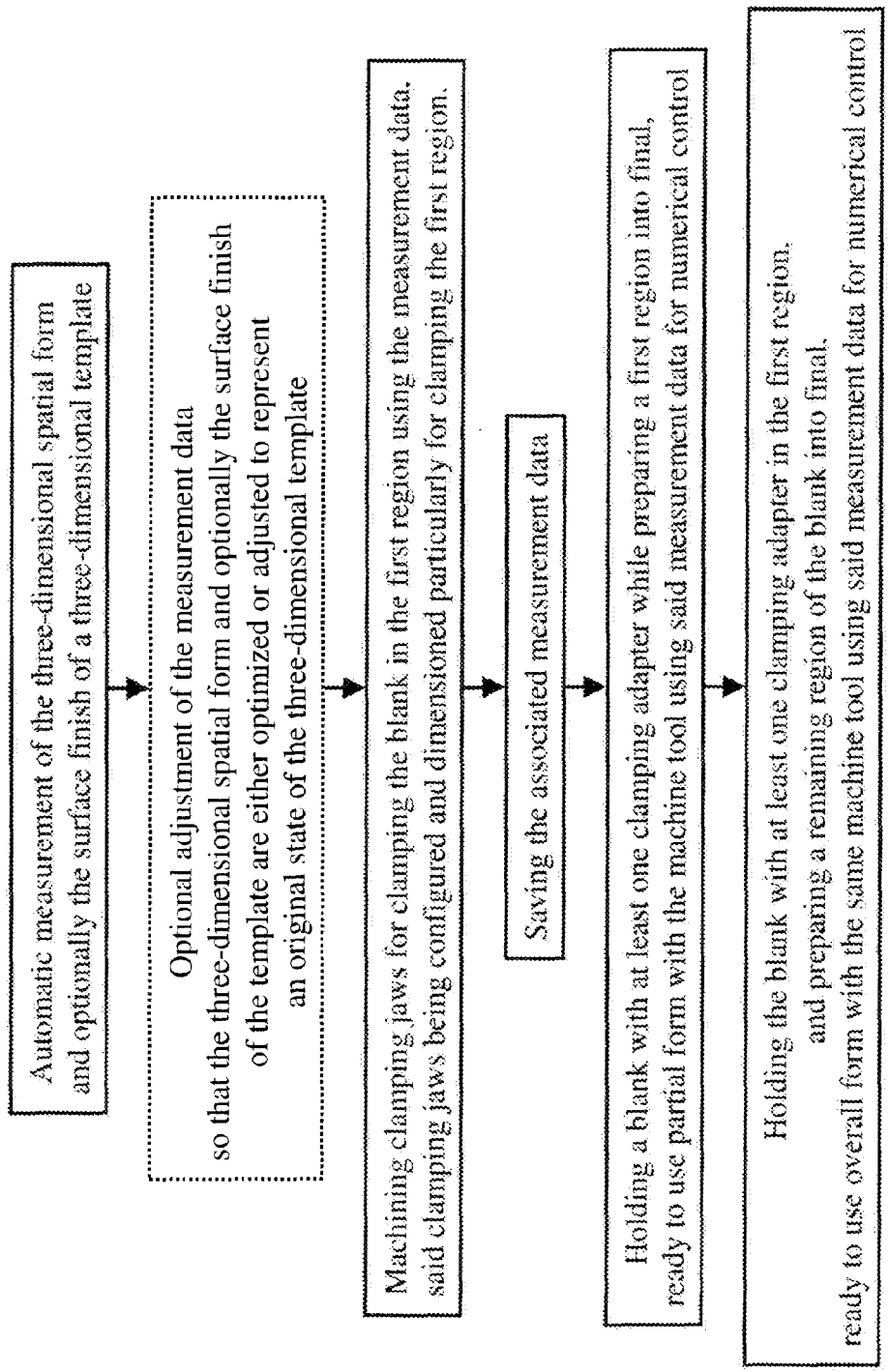
FIG. 24 shows a flow diagram of another exemplary method according to the invention, with an optional step indicated in the box formed of dashed lines.

15. If according to specification: by means of the tipping handling system, which is equipped with two gripper tongs, which grips and clamps the blank in the turning clamping surfaces, the unmachined blade is removed from the W-axis clamping unit 16 by tipping and, if need be, by the NC axis movement (U/V) and transported into the A axis 7, to the clamping adapter (FIG. 19). This operation may also take place by an external handling system or manually.

16. After the clamping of the unmachined blade in the A-axis clamping adapter, either a centering bore (for tailstock systems) or a clamping cylinder (tailstock collet) is provided by means of the milling spindle at the end of the unmachined blade (drilling or milling).

17. The tailstock center or collet is brought into position by means of the U/V axes and in this way the unmachined blade is centered and clamped between the A-axis clamping adapter and the tailstock spindle.

18. The unmachined blade fixed in this way is then finish-machined with the NC program produced in item II.10.4, the airfoil contours including all accessible tip contours. Cf. in this respect FIG. 20.

19. After that, the tailstock center 11 is retracted, the tailstock 10 itself is brought into a neutral position. As a result, the remaining tip contour is freely accessible for the milling spindle 32 (cf. FIG. 21).

20. The remaining tip contour is completed by means of a subprogram produced in item II.10.4.

21. Following this, the complete airfoil and tip contour is measured with the measuring program produced in item II.10.3 (cf. FIG. 22).

22. Thereafter, a complete measuring log is produced.

23. In the event of tolerance deviations, the appropriate NC block components are corrected automatically by the integration of a tolerance circle correction.

24. After that, the finished blade is removed from the A-axis clamping and a new raw part is placed in the W-axis clamping (by robot or manually).

III.2 Production Sequence for Longer Service Blades (suitable for blades >200 mm, cf. in this respect FIGS. 12-16)

1. For the determination of the old service blade geometry, item II. is carried out.

2. The acquired measurement data are then prepared in a CAD system in such a way that the root and tip geometry of the old service blade is created.

3. After that, a revision of the root and tip geometry of the old service blade takes place, with the aim of eliminating all the worn segments of these portions. In this way, the final geometry of the root and tip geometry is created.

4. By means of the final geometry of the root portion, an NC program for the manufacture of clamping jaws for clamping this root portion is produced.

5. By means of the program, in the first step a set of clamping jaws with which the root portion of the service blade to be produced can be received in a defined manner in the A-axis clamping unit is manufactured on the A-axis clamping unit.

6. The service blade is clamped in this A-axis clamping unit.

7. The old service blade geometry (remaining contours of the blade) is determined and prepared in the way described in items II.2 to II.7.

8. After that, the required NC milling and measuring programs (items II.10.1 to II.10.4) for the new service blade are produced.

9. Production sequence for the production of a new service blade.

10. Parallel clamping jaws with which the rectangular blank or the cast blade end can be clamped are mounted in the A clamping adapter.

11. A blank 38 is clamped in the A-axis clamping unit 7 (cf. FIG. 12).

12. In the first step, either a centering bore (for tailstock systems) or a clamping cylinder (tailstock collet) is then provided by means of the milling spindle at the end of the unmachined blade (drilling or milling).

13. The tailstock center or collet is brought into position by means of the U/V axes and in this way the unmachined blade is centered and clamped between the A-axis clamping adapter and the tailstock spindle.

14. The complete blade geometry apart from the inaccessible root and tip end contours is manufactured with the NC milling program produced in item II.10.4. In addition, two notching cuts are milled onto the root and tip ends. Cf. in this respect FIG. 13.

Figure 14:
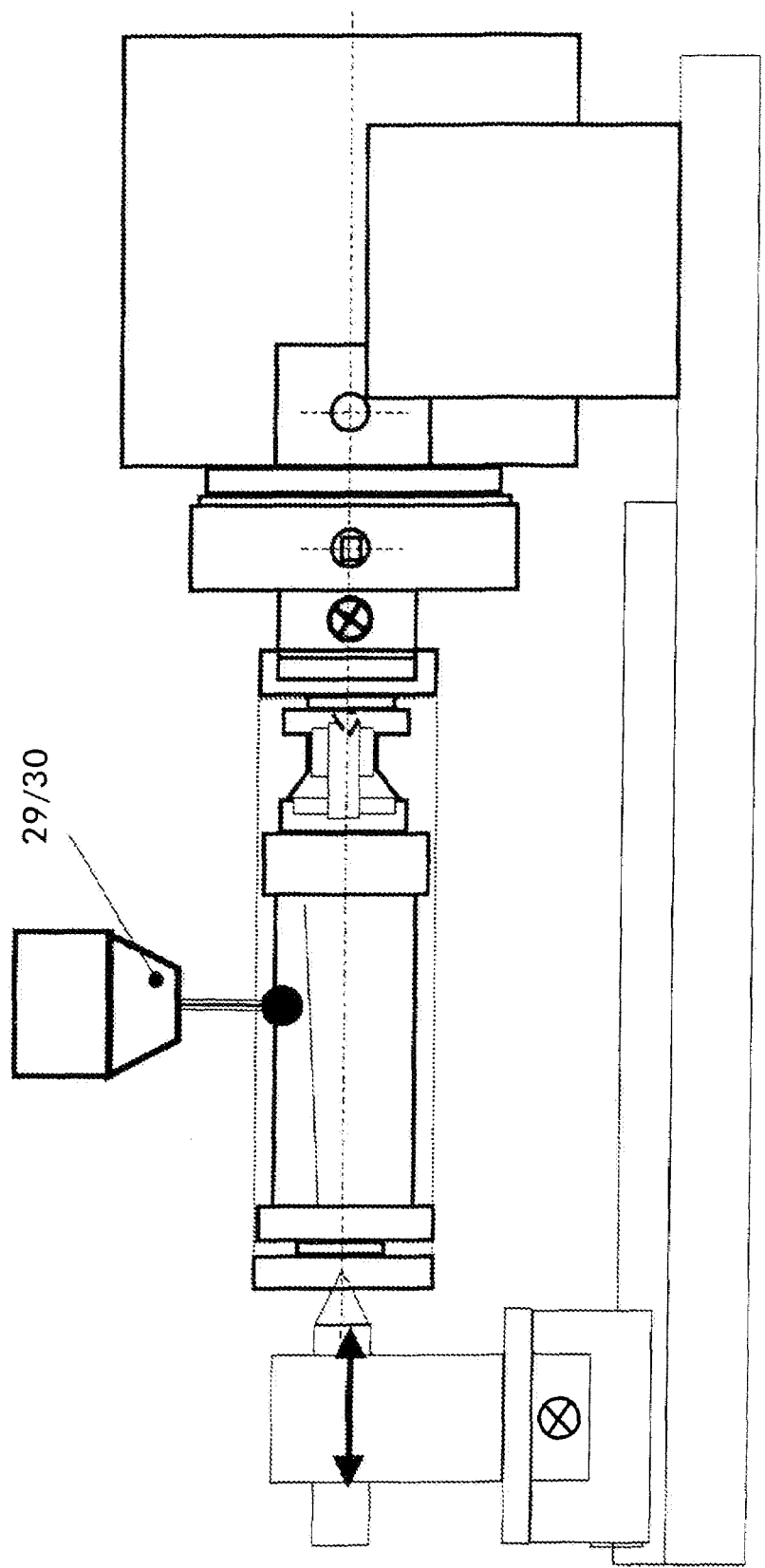
FIG. 14 shows production of a large blade, third step, measuring of the blade.

15. The manufactured blade geometry is measured by means of the NC measuring program produced in item II10.2 (FIG. 14).

16. If not according to specification:—NC milling program optimization—

Figure 15:
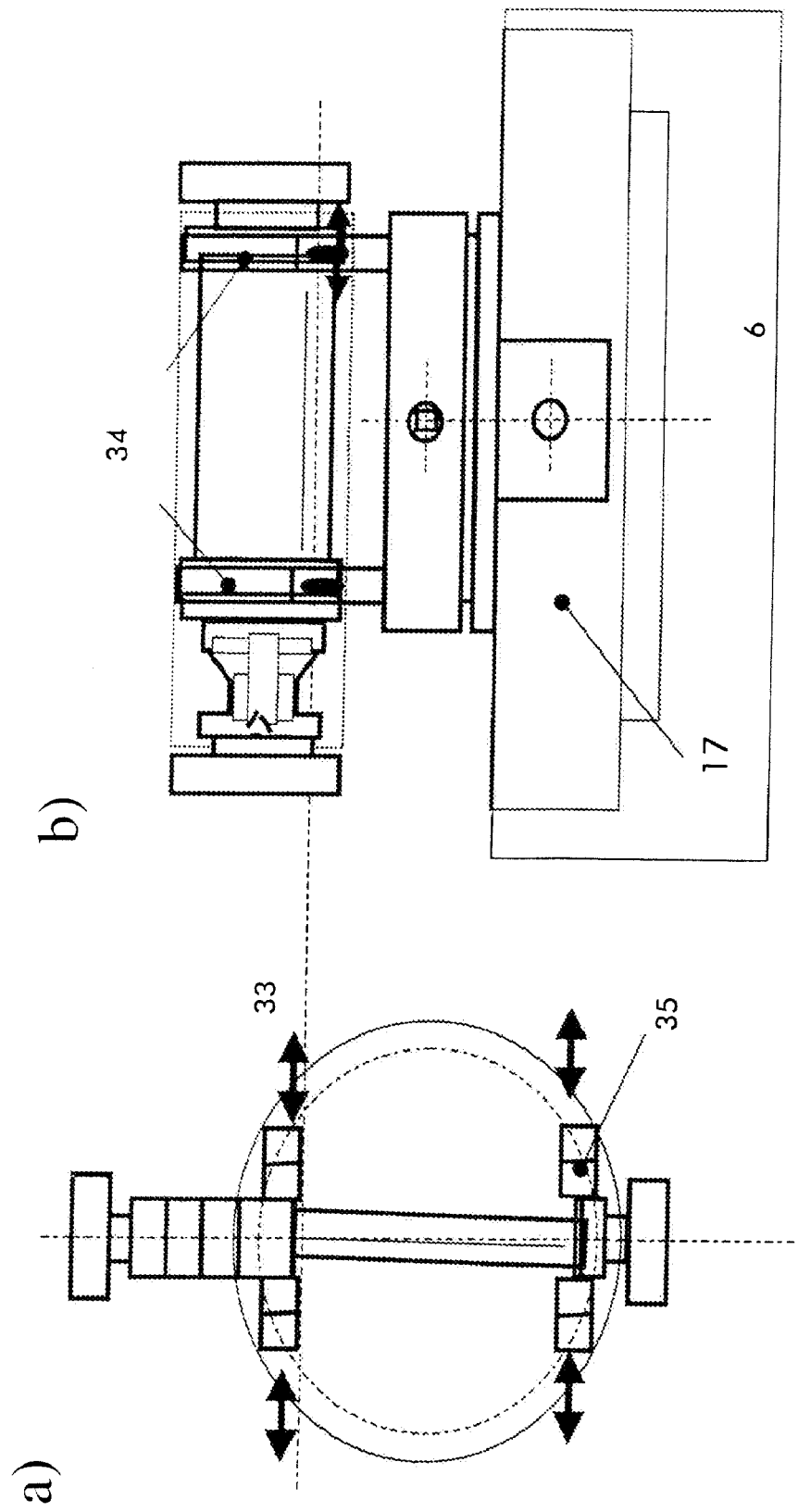
FIG. 15 shows production of a large blade, clamping of the blade on the W axis, a) view from above, b) side view.

17. If according to specification: by means of the tipping handling system, which is equipped with two gripper tongs, which grips and clamps the blank in the turning clamping surfaces, the blade is removed from the W-axis clamping unit 17 by tipping and, if need be, by the NC axis movement (U/V) and transported into the A axis 17, to the rhombic clamping adapter. This operation may also take place by an external handling system or manually (FIG. 15).

Figure 16:
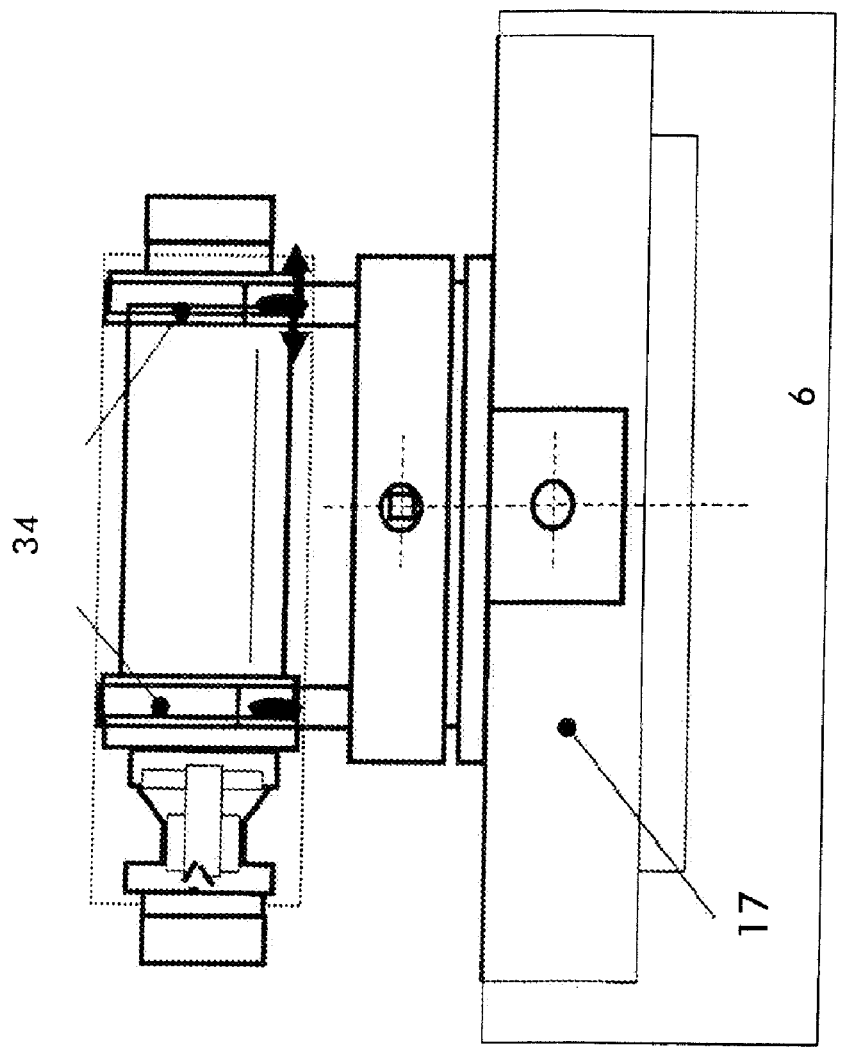
FIG. 16 shows production of a large blade, finish-milling of the root and tip geometry on the W axis.

18. After the clamping of the blade in the rhombic clamping adapter on the W axis 17, the previously inaccessible root and tip portions are completed and subsequently measured (FIG. 16).

19. Thereafter, a complete measuring log is produced.

20. In the event of tolerance deviations, the appropriate NC block components are corrected automatically by the integration of a tolerance circle correction.

21. After that, the finished blade is removed from the W-rhombic clamping adapter and a new unmachined part is placed in the A-axis clamping (by robot or manually).

The novel concept allows the service blade data to be determined on one and the same machine, then processed in the CAD-CAM system, for example in a CATIA format, including a flow optimization calculation, and this new service blade to be manufactured on the same machine in the shortest time and at the lowest costs by means of all the available new optimized blade production technologies (Heli milling technology, etc.). Furthermore, the complete data documentation is automatically prepared in the system.

Comparison

| Determination of service blade geometry data | | |
| --- | --- | --- |
| Old: | by means of measuring machine and manually | about 24 h |
| New: | in the system | about 1-2 h |
| Production of NC milling program | | |
| Old: | manual input of the data into the CAD system | about 3 days |
| | or manual programming | about 5 days |
| New: | in the system | about 0.5 h |
| Production of NC measuring program | | |
| Old: | only possible manually on measuring machine | about 5 h |
| | the blades must all be measured manually | about 2 h/part |
| New: | in the system | about 0.5 h |
| Calculation of flow optimization | | |
| Old: | not possible | |
| New: | in the system | about 3 h |
| Blade manufacturing time | | |
| Old: | fragmented old technologies only to a limited extent by means of NC technology | about 8 h/part |
| New: | in the system | about 0.5 h/part |
| Order throughput time for 150 blades | | |
| Old: | | 14-18 weeks |
| New: | in the service system on single machines | 4-7 days |
| | on a special cell (possible if data are the same) | 2-3 days |

| LIST OF DESIGNATIONS | |
| --- | --- |
| 1 | X-axis slide |
| 2 | Y-axis slide |
| 3 | Z-axis slide |
| 4 | Rotational axis of spindle |
| 5 | Machine bed |
| 6 | Machine bench |
| 7 | A axis; NC rotational axis |
| 8 | A axis; clamping adapter |
| 9 | Exchangeable clamping adapter jaws |
| 10 | Tailstock |
| 11 | Tailstock center or collet |
| 12 | U axis of tailstock |
| 13 | V axis of tailstock |

-continued

LIST OF DESIGNATIONS

| | |
|---|---|
| 14 | Tipping handling system |
| 15 | Exchangeable clamping adapter jaws |
| 16 | W-axis clamping adapter |
| 17 | W axis |
| 18-20 | Different positions of the tailstock |
| 21 | Three or four internally threaded bores |
| 22 | Spindle chuck HSK 80 with 100 mm flange diameter; three or four internally threaded bores |
| 23 | Large clamping plate for receiving large special clamping elements for large blades |
| 24 | Three or four screws for screwing the large clamping plate on the spindle nose |
| 25 | Large special clamping elements for large blades |
| 26 | Short cylinder for fixing the large clamping plate |
| 27 | Special clamping adapter |
| 28 | Service blade to be measured |
| 29 | Measuring probe |
| 30 | Slit scanner |
| 31 | Turned 3 × 120°, etc. |
| 32 | Milling spindle with tool |
| 33 | Clamping displacement |
| 34 | Defined clamping surfaces |
| 35 | Exchangeable clamping jaws |
| 36 | Parallel clamping jaws |
| 37 | Root portion of the service blade |
| 38 | Blank |

What is claimed is:

1. A process for machining a blank from all directions with a machine tool, the machining from all directions being based on a three-dimensional template, wherein the three-dimensional template is for a blade that is to be replaced in a turbine, the blade has a length greater than 200 mm, and the machine tool includes a machine bench having an A-axis and a W-axis, the process comprising:

automatically measuring three-dimensional spatial form and optionally surface finish of the three-dimensional template, and saving associated measurement data, the three-dimensional template being restrained in clamped position during a portion of the measuring at ends thereof in the A-axis, and the three-dimensional template being restrained at a central region thereof during another portion of the measuring for tip and root regions of the three-dimensional template;

holding the blank with at least one first clamping adapter while preparing a first region into final, ready to use partial form with the machine tool using said measurement data for numerical control, wherein while preparing the first region, the blank is grasped in the A-axis of the machine bench, with the blank being grasped proximate at least one end thereof using the at least one first clamping adapter and being fixed at another end using a movable tailstock; and holding the blank with at least one second clamping adapter in the first region that was already prepared, and preparing a remaining region of the blank into final, ready to use overall form with the same machine tool using said measurement data for numerical control, wherein while preparing the remaining region, the blank is grasped on defined clamping surfaces in the W-axis by clamping jaws of the at least one second clamping adapter.

2. The method of claim 1, wherein after being acquired the measurement data are adjusted before the blank is prepared with the machine tool so that the three-dimensional spatial form and optionally the surface finish of the three-dimensional template are either optimized or adjusted to represent an original state of the three-dimensional template.

3. The method of claim 1, wherein measuring the three-dimensional template and preparing the blank with the machine tool are carried out on a single machine tool.

4. The method of claim 3, wherein the machine tool is a milling machine.

5. The method of claim 3, wherein the machine tool is a 4-axis bench-type machine with means for mounting the blank in two chucking setups and with means for measuring the three-dimensional spatial form and optionally the surface finish of the three-dimensional template.

6. The method of claim 3, wherein the machine tool is a 4-axis bench-type machine with means for mounting the blank in two chucking setups and with means for measuring the three-dimensional spatial form and optionally the surface finish of the blank.

7. The method of claim 3, wherein the machine tool is a 4-axis bench-type machine with means for mounting the blank in two chucking setups and with means for measuring the three-dimensional spatial form and optionally the surface finish of the blank after being machined.

8. The method of claim 1, wherein the three-dimensional spatial form of the three-dimensional template is a moving blade of a turbine.

9. The method of claim 1, wherein the three-dimensional spatial form of the three-dimensional template is a stationary blade of a turbine.

10. The method of claim 1, wherein the three-dimensional spatial form and optionally the surface finish of the three-dimensional template are determined automatically using a measuring probe.

11. The method of claim 1, wherein the three-dimensional spatial form and optionally the surface finish of the three-dimensional template are determined automatically using a slit scanner.

12. The method of claim 1, wherein the three-dimensional spatial form and optionally the surface finish of the three-dimensional template are determined in multiple stages using different rotational positions of the A-axis.

13. The method of claim 1, wherein the clamping jaws are configured and dimensioned for grasping defined clamping surfaces of a particular blade.

14. The method of claim 1, wherein at least one of the first and second clamping adapters is configured and dimensioned for grasping defined clamping surfaces of a particular blade.

15. A process for machining a blank from all directions with a machine tool, the machining from all directions being based on a three-dimensional template, wherein the machine tool includes a machine bench having an A-axis, the process comprising:

automatically measuring three-dimensional spatial form and optionally surface finish of the three-dimensional template, and saving associated measurement data, the three-dimensional template being restrained in clamped position during a portion of the measuring at ends thereof in the A-axis, and the three-dimensional template being restrained at a central region thereof during another portion of the measuring for tip and root regions of the three-dimensional template;

using the measurement data, machining clamping jaws for clamping the blank in a first region, said clamping jaws being configured and dimensioned particularly for clamping the first region;

holding the blank with at least one first clamping adapter while preparing the first region into final, ready to use partial form with the machine tool using said measurement data for numerical control; and holding the blank with at least one second clamping adapter having the clamping jaws, the blank being held in the first region that was already prepared, and preparing a remaining region of the blank into final, ready to use overall form with the same machine tool using said measurement data for numerical control.

16. The method of claim 15, wherein after being acquired the measurement data are adjusted before the clamping jaws are machined so that the three-dimensional spatial form and optionally the surface finish of the three-dimensional template are either optimized or adjusted to represent an original state of the three-dimensional template.

17. The method of claim 15, wherein after being acquired the measurement data are adjusted before the blank is prepared with the machine tool so that the three-dimensional spatial form and optionally the surface finish of the thee-dimensional template are either optimized or adjusted to represent an original state of the three-dimensional template.

18. The method of claim 15, wherein measuring the three-dimensional template and preparing the blank with the machine tool are carried out on a single machine tool.

19. The method of claim 18, wherein the machine tool is a milling machine.

20. The method of claim 18, wherein the machine tool is a 4-axis bench-type machine with means for mounting the blank in two chucking setups and with means for measuring the three-dimensional spatial form and optionally the surface finish of the three-dimensional template.

21. The method of claim 18, wherein the machine tool is a 4-axis bench-type machine with means for mounting the blank in two chucking setups and with means for measuring the three-dimensional spatial form and optionally the surface finish of the blank.

22. The method of claim 18, wherein the machine tool is a 4-axis bench-type machine with means for mounting the blank in two chucking setups and with means for measuring the three-dimensional spatial form and optionally the surface finish of the blank after being machined.

23. The method of claim 15, wherein the three-dimensional spatial form of the three-dimensional template is a moving blade of a turbine or a stationary blade of a turbine.

24. The method of claim 15, wherein the three-dimensional spatial form and optionally the surface finish of the three-dimensional template are determined automatically using a measuring probe.

25. The method of claim 15, wherein the three-dimensional spatial form and optionally the surface finish of the three-dimensional template are determined automatically using a slit scanner.

26. The method of claim 15, wherein the three-dimensional spatial form and optionally the surface finish of the three-dimensional template are determined in multiple stages using different rotational positions of the A-axis.

27. The method of claim 15, wherein:
the three-dimensional template is a blade that is a moving blade or stationary blade that is to be replaced in a turbine and the blade has a length greater than 200 mm;
while preparing the first region, the blank is grasped in the A-axis of the machine bench, the blank being grasped proximate at least one end thereof using the at least one first clamping adapter and being fixed at another end thereof using a movable tailstock; and
while preparing the remaining region, the blank is grasped on defined clamping surfaces in a W-axis of the machine bench by the clamping jaws of the at least one second clamping adapter.

28. The method of claim 15, wherein:
the three-dimensional template is a blade that is a moving blade or stationary blade that is to be replaced in a turbine and the blade has a length less than 200 mm;
while preparing the first region, the blank is grasped by the clamping jaws in a W-axis of the machine bench; and
wherein while preparing the remaining region, the blank is grasped in the A-axis of the machine bench, the blank being grasped proximate at least one end thereof that has already been prepared and being grasped using the clamping jaws of the at least one second clamping adapter and optionally fixed at another end thereof using a movable tailstock.

29. A process for machining a blank from all directions with a single machine tool, the machining from all directions being based on a three-dimensional template, wherein the three-dimensional template is a blade that is a moving blade or stationary blade that is to be replaced in a turbine and the blade has a length less than 200 mm, and wherein the machine tool includes a machine bench having an A-axis and a W-axis, the process comprising:
automatically measuring three-dimensional spatial form and optionally surface finish of the three-dimensional template in the machine tool, and saving associated measurement data, the three-dimensional template being restrained in clamped position during a portion of the measuring at ends thereof in the A-axis, and the three-dimensional template being restrained at a central region thereof during another portion of the measuring for tip and root regions of the three-dimensional template;
holding the blank with at least one first clamping adapter while preparing a first region into final, ready to use partial form with the machine tool using said measurement data for numerical control, wherein while preparing the first region, the blank is grasped by clamping jaws of the at least one first clamping adapter in the W-axis of the machine bench; and
holding the blank with at least one second clamping adapter in the first region that was already prepared, and preparing a remaining region of the blank into final, ready to use overall form with the same machine tool using said measurement data for numerical control, wherein while preparing the remaining region, the blank is grasped in the A-axis of the machine bench, the blank being grasped proximate at least one end thereof that has already been prepared and being grasped and optionally fixed at another end thereof by means of a movable tailstock.

* * * * *